(12) United States Patent
Altieri

(10) Patent No.: US 10,846,941 B2
(45) Date of Patent: Nov. 24, 2020

(54) INTERACTIVE VIRTUAL THEMATIC ENVIRONMENT

(71) Applicant: Frances Barbaro Altieri, Belmont, MA (US)

(72) Inventor: Frances Barbaro Altieri, Belmont, MA (US)

(*) Notice: Subject to any disclaimer, the term of this patent is extended or adjusted under 35 U.S.C. 154(b) by 0 days.

(21) Appl. No.: 16/833,127

(22) Filed: Mar. 27, 2020

(65) Prior Publication Data
US 2020/0226842 A1 Jul. 16, 2020

Related U.S. Application Data

(60) Continuation of application No. 15/348,348, filed on Nov. 10, 2016, which is a continuation of application
(Continued)

(51) Int. Cl.
*H04N 13/366* (2018.01)
*G06T 19/00* (2011.01)
(Continued)

(52) U.S. Cl.
CPC ............ *G06T 19/006* (2013.01); *A63F 13/12* (2013.01); *A63F 13/215* (2014.09);
(Continued)

(58) Field of Classification Search
CPC .... G06T 19/006; A63F 13/215; A63F 13/216; A63F 13/217; A63F 13/335
See application file for complete search history.

(56) References Cited

U.S. PATENT DOCUMENTS 5,495,576 A 2/1996 Ritchey
5,509,806 A 4/1996 Ellsworth
(Continued)

FOREIGN PATENT DOCUMENTS

WO WO 98/50884 11/1998

OTHER PUBLICATIONS

Final Office Action issued in U.S. Appl. No. 15/348,438 dated Dec. 26, 2018.
(Continued)

*Primary Examiner* — Jonathan R Messmore
(74) *Attorney, Agent, or Firm* — Dunlap Codding, P.C.

(57) ABSTRACT

The present disclosure describes a method of integrating information, including real-time information, into a virtual thematic environment using a computer system, including accessing the stored information from a database or downloading the real-time information from a source external to the thematic environment; inserting the real-time information into the thematic environment; and displaying the information to a user within the thematic environment. In one embodiment, the computer system is connected to a holographic projection system such that the images from the thematic environment can be projected as holographic projections. The computer system includes an interactive software application platform having at least one thematic/publishing logic module which contains thematic environment rules; at least one digital content library module which provides content management on the thematic environment; and at least one quantum imaging environment (QIE) module which interprets content such that the content is manipulated and accessed by any device.

30 Claims, 7 Drawing Sheets

Related U.S. Application Data

No. 13/137,299, filed on Aug. 4, 2011, now Pat. No. 10,255,724, which is a division of application No. 12/073,967, filed on Mar. 12, 2008, now Pat. No. 8,225,220, which is a division of application No. 10/805,415, filed on Mar. 22, 2004, now Pat. No. 7,373,377.

(51) Int. Cl.

| | | |
|---|---|---|
| A63F 13/65 | (2014.01) | |
| A63F 13/35 | (2014.01) | |
| A63F 13/335 | (2014.01) | |
| G06Q 30/02 | (2012.01) | |
| H04N 13/363 | (2018.01) | |
| A63F 13/30 | (2014.01) | |
| A63F 13/215 | (2014.01) | |
| A63F 13/216 | (2014.01) | |
| A63F 13/217 | (2014.01) | |
| G03H 1/00 | (2006.01) | |

(52) U.S. Cl.
CPC .......... *A63F 13/216* (2014.09); *A63F 13/217* (2014.09); *A63F 13/335* (2014.09); *A63F 13/35* (2014.09); *A63F 13/65* (2014.09); *G03H 1/0005* (2013.01); *G06Q 30/02* (2013.01); *G06Q 30/0241* (2013.01); *G06Q 30/0257* (2013.01); *G06Q 30/0269* (2013.01); *H04N 13/363* (2018.05); *H04N 13/366* (2018.05)

(56) References Cited

U.S. PATENT DOCUMENTS

| | | | |
|---|---|---|---|
| 5,732,227 A | | 3/1998 | Kuzunuki et al. |
| 5,736,955 A | | 4/1998 | Roif |
| 5,751,576 A | | 5/1998 | Monson |
| 5,846,086 A | | 12/1998 | Bizzi et al. |
| 5,850,352 A | | 12/1998 | Moezzi et al. |
| 5,877,757 A | * | 3/1999 | Baldwin .............. G06F 16/9558 715/705 |
| 5,956,038 A | | 9/1999 | Rekimoto |
| 5,993,319 A | | 11/1999 | Aoyama |
| 6,020,885 A | | 2/2000 | Honda |
| 6,057,834 A | | 5/2000 | Pickover |
| 6,057,856 A | | 5/2000 | Miyashita et al. |
| 6,099,408 A | | 8/2000 | Schneier et al. |
| 6,215,498 B1 | | 4/2001 | Filo et al. |
| 6,226,669 B1 | | 5/2001 | Huang et al. |
| 6,227,974 B1 | | 5/2001 | Eilat et al. |
| 6,243,104 B1 | | 6/2001 | Murray |
| 6,256,043 B1 | | 7/2001 | Aho et al. |
| 6,256,045 B1 | | 7/2001 | Bae et al. |
| 6,259,889 B1 | | 7/2001 | LaDue |
| 6,308,565 B1 | | 10/2001 | French et al. |
| 6,396,497 B1 | | 5/2002 | Reichlen |
| 6,409,599 B1 | | 6/2002 | Sprout et al. |
| 6,412,949 B1 | | 7/2002 | Halldorsson |
| 6,470,630 B1 | | 10/2002 | Miyamoto |
| 6,471,586 B1 | | 10/2002 | Aiki |
| 6,507,353 B1 | | 1/2003 | Huard et al. |
| 6,538,660 B1 | * | 3/2003 | Celi, Jr. .................. G09G 5/14 345/592 |
| 6,546,309 B1 | | 4/2003 | Gazzuolo |
| 6,557,041 B2 | | 4/2003 | Mallart |
| 6,563,489 B1 | | 5/2003 | Latypov et al. |
| 6,616,533 B1 | | 9/2003 | Rashkovskiy |
| 6,657,584 B2 | | 12/2003 | Cavallaro et al. |
| 6,686,936 B1 | * | 2/2004 | Nason ...................... G09G 1/16 707/999.003 |
| 6,749,432 B2 | | 6/2004 | French et al. |
| 6,767,287 B1 | | 7/2004 | Mcquaid et al. |
| 6,999,071 B2 | | 2/2006 | Balogh |
| 7,128,705 B2 | | 10/2006 | Brendley et al. |
| 7,184,209 B2 | | 2/2007 | Simonsen et al. |
| 7,190,331 B2 | | 3/2007 | Genc et al. |
| 7,229,288 B2 | | 6/2007 | Stuart et al. |
| 7,558,578 B1 | | 7/2009 | De Beer |
| 7,697,750 B2 | | 4/2010 | Simmons |
| 7,747,730 B1 | | 6/2010 | Harlow |
| 7,831,292 B2 | | 11/2010 | Quaid et al. |
| 8,046,408 B2 | | 10/2011 | Torabi |
| 2001/0045949 A1 | | 11/2001 | Chithambaram et al. |
| 2002/0002076 A1 | | 1/2002 | Schneier et al. |
| 2002/0024517 A1 | | 2/2002 | Yamaguchi et al. |
| 2002/0059369 A1 | * | 5/2002 | Kern .................. G06Q 30/0277 709/203 |
| 2002/0082077 A1 | | 6/2002 | Johnson et al. |
| 2002/0090985 A1 | | 7/2002 | Tochner et al. |
| 2002/0096831 A1 | | 7/2002 | Nakayama et al. |
| 2002/0118272 A1 | * | 8/2002 | Bruce-Smith .......... H04N 7/148 348/14.08 |
| 2002/0138607 A1 | | 9/2002 | O'Rourke et al. |
| 2002/0154174 A1 | | 10/2002 | Redlich et al. |
| 2002/0154349 A1 | | 10/2002 | Halldorsson et al. |
| 2002/0158873 A1 | | 10/2002 | Williamson |
| 2002/0161521 A1 | | 10/2002 | Abe et al. |
| 2002/0188678 A1 | | 12/2002 | Edecker et al. |
| 2002/0191019 A1 | * | 12/2002 | Pickett .................... G06F 9/451 715/764 |
| 2002/0198652 A1 | * | 12/2002 | Hirayama .............. G01C 21/20 701/532 |
| 2003/0004743 A1 | | 1/2003 | Callegari |
| 2003/0022719 A1 | | 1/2003 | Donald et al. |
| 2003/0033150 A1 | | 2/2003 | Balan et al. |
| 2003/0064807 A1 | | 4/2003 | Walker et al. |
| 2003/0080978 A1 | | 5/2003 | Navab et al. |
| 2003/0122828 A1 | | 7/2003 | Lukyanitsa |
| 2003/0125963 A1 | | 7/2003 | Haken |
| 2003/0134676 A1 | | 7/2003 | Kang |
| 2003/0142379 A1 | | 7/2003 | Takemori et al. |
| 2003/0144861 A1 | | 7/2003 | Misawa et al. |
| 2003/0151786 A1 | | 8/2003 | Drinkwater |
| 2003/0156260 A1 | | 8/2003 | Putilin et al. |
| 2003/0160864 A1 | | 8/2003 | Kremen |
| 2003/0176213 A1 | | 9/2003 | LeMay et al. |
| 2003/0177248 A1 | | 9/2003 | Brown et al. |
| 2003/0191799 A1 | | 10/2003 | Araujo et al. |
| 2004/0002843 A1 | | 1/2004 | Robarts et al. |
| 2004/0058732 A1 | | 3/2004 | Piccionelli |
| 2004/0150666 A1 | | 8/2004 | Fager et al. |
| 2004/0216098 A1 | | 10/2004 | Roe et al. |
| 2005/0043097 A1 | | 2/2005 | March et al. |
| 2005/0049022 A1 | | 3/2005 | Mullen |
| 2005/0130725 A1 | | 6/2005 | Creamer et al. |
| 2005/0202877 A1 | | 9/2005 | Uhlir et al. |
| 2005/0212910 A1 | | 9/2005 | Singhal |
| 2006/0046699 A1 | | 3/2006 | Guyot et al. |
| 2007/0099703 A1 | | 5/2007 | Terebilo |
| 2007/0109619 A1 | | 5/2007 | Eberl et al. |
| 2007/0183211 A1 | | 8/2007 | Yano et al. |
| 2010/0188638 A1 | | 7/2010 | Eberl et al. |

OTHER PUBLICATIONS

Non-Final Office Action issued in U.S. Appl. No. 15/348,438 dated May 31, 2018.

Non-Final Office Action issued in U.S. Appl. No. 13/137,299 dated Jul. 8, 2014.

Final Office Action issued in U.S. Appl. No. 13/137,299 dated Jan. 15, 2015.

Non-Final Office Action issued in U.S. Appl. No. 13/137,299 dated Oct. 27, 2015.

Final Office Action issued in U.S. Appl. No. 13/137,299 dated May 19, 2016.

Non-Final Office Action issued in U.S. Appl. No. 13/137,299 dated May 15, 2017.

Final Office Action issued in U.S. Appl. No. 13/137,299 dated Jan. 18, 2018.

(56) References Cited

OTHER PUBLICATIONS

USPTO Patent Trial and Appeal Board, *Niantic, Inc.* v. *Barbaro Technologies, LLC*; Petition for Inter Partes Review of U.S. Pat. No. 7,373,377, IPR2019-00668, filed Feb. 12, 2019.
USPTO Patent Trial and Appeal Board; *Niantic, Inc.* v. *Barbaro Technologies, LLC*; Case No. IPR2019-00668, Patent Owner Preliminary Response, filed May 22, 2019.
USPTO Patent Trial and Appeal Board, *Niantic, Inc.* v. *Barbaro Technologies, LLC*; Petition for Inter Partes Review of U.S. Pat. No. 7,373,377, IPR2019-00669, filed Feb. 12, 2019.
USPTO Patent Trial and Appeal Board; *Niantic, Inc.* v. *Barbaro Technologies, LLC*; Case No. IPR2019-00669, Patent Owner Preliminary Response, filed May 22, 2019.
USPTO Patent Trial and Appeal Board, *Niantic, Inc.* v. *Barbaro Technologies, LLC*; Petition for Inter Partes Review of U.S. Pat. No. 8,228,325, IPR2019-00672, filed Feb. 13, 2019.
USPTO Patent Trial and Appeal Board; *Niantic, Inc.* v. *Barbaro Technologies, LLC*; Case No. IPR2019-00672, Patent Owner Preliminary Response, filed Jun. 18, 2019.
U.S. District Court Northern District of California San Francisco Division; *Barbaro Technologies, LLC* v. *Niantic, Inc.*, Case No. 3:18-cv-02955-RS, Joint Claim Construction and Prehearing Statement Pursuant to Patent L.R. 4-3, filed Dec. 21, 2018.
U.S. District Court for the Northern District of California San Francisco Division; *Barbaro Technologies, LLC* v. *Niantic, Inc.*, Case No. 3:18-cv-02955-RS, Barbaro Technologies, LLC's Patent L.R. 4-5 (A) Opening Claim Construction Brief, filed Feb. 12, 2019.
U.S. District Court Northern District of California San Francisco Division; *Barbaro Technologies, LLC* v. *Niantic, Inc.*, Case No. 3:18-cv-02955-RS, Defendant Niantic, Inc.'s Responsive Claim Construction Brief, filed Feb. 25, 2019.
U.S. District Court Northern District of California San Francisco Division; *Barbaro Technologies, LLC* v. *Niantic, Inc.*, Case No. 3:18-cv-02955-RS, Barbaro Technologies, LLC's Patent L.R. 4-5(C) Reply to Niantic's Responsive Claim Construction Brief, filed Mar. 5, 2019.
U.S. District Court Northern District of California San Francisco Division; *Barbaro Technologies, LLC* v. *Niantic, Inc.*, Case No. 3:18-cv-02955-RS, Defendant Niantic, Inc.'s Patent L.R. 3-3 Invalidity Contentions, filed Oct. 16, 2018.
USPTO Trial and Appeal Board; *Niantic, Inc.* v. *Barbaro Technologies, LLC*; Declaration of Stephen Gray in Support of Petition for Inter Partes Review of U.S. Pat. No. 8,228,325, Niantic Exhibit 1002, dated Feb. 13, 2019.
Curriculum Vitae for Stephen Gray, Niantic Exhibit No. 1003.
USPTO Provisional Application for Patent Cover Sheet for U.S. Appl. No. 60/496,752, Niantic Exhibit No. 1006, dated Aug. 21, 2003.
District Court Northern District of California San Francisco Division; *Barbaro Technologies, LLC* v. *Niantic, Inc.*, Case No. 3:18-cv-02955-RS, Barbaro Technologies, LLC's Amended Disclosure of Asserted Claims and Infringement Contentions, Niantic Exhibit No. 1010, dated Sep. 6, 2018.
USPTO Provisional Application for Patent Cover Sheet for U.S. Appl. No. 60/380,552, Niantic Exhibit No. 1011, dated May 13, 2002.
USPTO Trial and Appeal Board; *Niantic, Inc.* v. *Barbaro Technologies, LLC*; Declaration of Stephen Gray in Support of Petition for Inter Partes Review of U.S. Pat. No. 7,373,377, Niantic Exhibit 1002, dated Feb. 12, 2019.
USPTO Trial and Appeal Board; *Niantic, Inc.* v. *Barbaro Technologies, LLC*; Case IPR 2019-00668, U.S. Pat. No. 7,373,377 B2, Decision Denying Institution of Inter Partes Review 35 U.S.C. 314(a); Entered Aug. 14, 2019.
USPTO Trial and Appeal Board; *Niantic, Inc.* v. *Barbaro Technologies, LLC*; Case IPR 2019-00669, U.S. Pat. No. 7,373,377 B2, Decision Denying Institution of Inter Partes Review 35 U.S.C. 314(a); Entered Aug. 16, 2019.
USPTO Trial and Appeal Board; *Niantic, Inc.* v. *Barbaro Technologies, LLC*; Case IPR 2019-00672, U.S. Pat. No. 8,228,325 B2, Decision Denying Institution of Inter Partes Review 35 U.S.C. 314(a); Entered Sep. 5, 2019.
USPTO Office Action regarding U.S. Appl. No. 10/805,415, dated Aug. 16, 2005.
Response to Restriction Requirement dated Aug. 16, 2005 regarding U.S. Appl. No. 10/805,415, filed Sep. 13, 2005.
USPTO Office Action regarding U.S. Appl. No. 10/805,415, dated Dec. 7, 2005.
Amendment in Response to the Non-Final Office Action dated Dec. 7, 2005 regarding U.S. Appl. No. 10/805,415, filed Feb. 27, 2006.
USPTO Final Office Action regarding U.S. Appl. No. 10/805,415, dated Jun. 23, 2006.
Amendment in Response to the Final Office Action dated Jun. 23, 2006 regarding U.S. Appl. No. 10/805,415, filed Nov. 22, 2006.
USPTO Office Action regarding U.S. Appl. No. 10/805,415, dated Dec. 21, 2006.
Amendment in Response to the Non-Final Office Action dated Dec. 21, 2006 regarding U.S. Appl. No. 10/805,415, filed Mar. 21, 2007.
USPTO Final Office Action regarding U.S. Appl. No. 10/805,415, dated May 3, 2007.
Response to the Final Office Action dated May 3, 2007 regarding U.S. Appl. No. 10/805,415, filed Aug. 1, 2007.
Preliminary Amendment in Response to the Final Office Action dated May 3, 2007 regarding U.S. Appl. No. 10/805,415, filed Nov. 13, 2007.
Response to Notice of Non-Compliant Amendment dated Nov. 14, 2007 regarding U.S. Appl. No. 10,805,415, filed Nov. 21, 2017.
Response to the Notice of Allowance dated Dec. 27, 2007 regarding U.S. Appl. No. 10/805,415, filed Mar. 13, 2008.
Preliminary Amendment regarding U.S. Appl. No. 12/073,967, filed Mar. 12, 2008.
USPTO Office Action regarding U.S. Appl. No. 12/073,967, dated Jul. 11, 2011.
Response to Restriction Requirement dated Jul. 11, 2011 regarding U.S. Appl. No. 12/073,967, filed Aug. 4, 2011.
USPTO Office Action regarding U.S. Appl. No. 12/073,967, dated Sep. 14, 2011.
Amendment in Response to the Non-Final Office Action dated Sep. 14, 2011 regarding U.S. Appl. No. 12/073,967, filed Jan. 17, 2012.
Preliminary Amendment regarding U.S. Appl. No. 13/137,299, filed Jun. 12, 2012.
Amendment in Response to the Non-Final Office Action dated Jul. 8, 2014 regarding U.S. Appl. No. 13/137,299, filed Oct. 7, 2014.
Amendment in Response to the Final Office Action dated Jan. 15, 2015 regarding U.S. Appl. No. 13/137,299, filed Apr. 8, 2015.
Response to the Final Office Action dated Jan. 15, 2015 and the Advisory Action dated Apr. 17, 2015 regarding U.S. Appl. No. 13/137,299, filed May 5, 2015.
USPTO Advisory Action regarding U.S. Appl. No. 13/137,299, dated Apr. 17, 2015.
Amendment in Response to the Non-Final Office Action dated Oct. 27, 2015 regarding U.S. Appl. No. 13/137,299, filed Jan. 27, 2016.
Amendment in Response to the Final Office Action dated May 19, 2016 regarding U.S. Appl. No. 13/137,299, filed Aug. 18, 2016.
USPTO Advisory Action regarding U.S. Appl. No. 13/137,299, dated Sep. 1, 2016.
Amendment in Response to the Advisory Action dated Sep. 1, 2016 regarding U.S. Appl. No. 13/137,299, filed Sep. 16, 2016.
Supplemental Amendment in Response to the Advisory Action dated Sep. 1, 2016 regarding U.S. Appl. No. 13/137,299, filed Oct. 14, 2016.
Amendment in Response to the Non-Final Office Action dated May 15, 2017 regarding U.S. Appl. No. 13/137,299, filed Oct. 16, 2017.
Amendment in Response to the Final Office Action dated Jan. 18, 2018 regarding U.S. Appl. No. 13/137,299, filed Apr. 18, 2018.
USPTO Advisory Action regarding U.S. Appl. No. 13/137,299, dated May 7, 2018.
Amendment in Response to the Final Office Action dated Jan. 18, 2018 and the Advisory Action dated May 7, 2018 regarding U.S. Appl. No. 13/137,299, filed Jun. 15, 2018.

(56) References Cited

OTHER PUBLICATIONS

Non-Final Office Action issued in U.S. Appl. No. 15/817,815 dated Mar. 19, 2019.
Final Office Action issued in U.S. Appl. No. 15/817,815 dated Dec. 9, 2019.
Preliminary Amendment regarding U.S. Appl. No. 15/348,438, filed Nov. 10, 2016.
Amendment in Response to the Non-Final Office Action dated May 31, 2018 regarding U.S. Appl. No. 15/348,438, filed Sep. 27, 2018.
Response to the Final Office Action dated Dec. 26, 2018 regarding U.S. Appl. No. 15/348,438, filed Mar. 11, 2019.
USPTO Advisory Action regarding U.S. Appl. No. 15/348,438, dated May 9, 2019.
Appeal Brief regarding U.S. Appl. No. 15/348,438, filed Sep. 13, 2019.
USPTO Office Action regarding U.S. Appl. No. 12/073,968 dated Aug. 21, 2009.
Amendment in Response to the Non-Final Office Action dated Aug. 21, 2009 regarding U.S. Appl. No. 12/073,968, filed Nov. 23, 2009.
Preliminary Amendment regarding U.S. Appl. No. 13/875,908, filed May 2, 2013.
USPTO Office Action regarding U.S. Appl. No. 13/875,908 dated Aug. 25, 2016.
Amendment in Response to the Non-Final Office Action dated Aug. 25, 2016 regarding U.S. Appl. No. 13/875,908, filed Dec. 23, 2016.
USPTO Final Office Action regarding U.S. Appl. No. 13/875,908 dated May 8, 2017.
Amendment in Response to the Final Office Action dated May 8, 2017 regarding U.S. Appl. No. 13/875,908, filed Sep. 28, 2017.
USPTO Advisory Action regarding U.S. Appl. No. 13/875,908, dated Oct. 11, 2017.
Amendment in Response to the Final Office Action dated May 8, 2017 and the Advisory Action dated Oct. 11, 2017 regarding U.S. Appl. No. 13/875,908, filed Nov. 7, 2017.
USPTO Office Action regarding U.S. Appl. No. 13/875,908 dated Nov. 30, 2017.
Amendment in Response to the Non-Final Office Action dated Nov. 30, 2017 regarding U.S. Appl. No. 13/875,908, filed Mar. 28, 2018.
USPTO Final Office Action regarding U.S. Appl. No. 13/875,908 dated May 2, 2018.
Amendment in Response to the Final Office Action dated May 2, 2018 regarding U.S. Appl. No. 13/875,908, filed Oct. 2, 2018.
USPTO Advisory Action regarding U.S. Appl. No. 13/875,908, dated Oct. 22, 2018.
Preliminary Amendment regarding U.S. Appl. No. 15/817,815, filed Nov. 20, 2017.
USPTO Office Action regarding U.S. Appl. No. 15/817,815 dated Mar. 19, 2019.
Amendment in Response to the Non-Final Office Action dated Mar. 19, 2019 regarding U.S. Appl. No. 15/817,815, filed Sep. 17, 2019.
USPTO Final Office Action regarding U.S. Appl. No. 15/817,815 dated Dec. 9, 2019.
US District Court Northern District of California, *Barbaro Technologies, LLC v. Niantic, Inc.*, Case No. 18-cv-02955-RS, Order Construing Claims, filed Feb. 12, 2020.
Bruce et al., "ARQuake: An Outdoor/Indoor Augmented Reality First Person Application", Proceedings of the Fourth International Symposium on Wearable Computers (ISWC'00), Oct. 2000.
US District Court Northern District of California San Francisco Division, *Barbaro Technologies, LLC v. Niantic, Inc.*, Case No. 3:18-cv-02955-RS, Defendant Niantic, Inc.'s Amended Patent L.R. 3-3 Invalidity Contentions, filed Mar. 21, 2019.

Baillot et al., "Authoring of Physical Models Using Mobile Computers", *Virtual Reality Laboratory, Advanced Information Technology Division, Naval Research Laboratory*, 2002.
Julier et al., "Urban Terrain Modeling for Augmented Reality Applications", *3D Synthetic Environment Reconstruction*, 2001.
Julier et al., "The Need for AI: Intuitive User Interfaces for Mobile Augmented Reality Systems", *Advanced Information Technology Naval Research Laboratory*, Aug. 2001.
Julier et al., "Information Filtering for Mobile Augmented Reality", *IEEE Computer Graphics and Applications*, vol. 22, Issue 5, Aug. 2002.
Sestito et al., "Intelligent Filtering for Augmented Reality", *Advanced Information Technology Naval Research Laboratory*, Feb. 2000.
MacIntyre et al., "Estimating and Adapting to Registration Errors in Augmented Reality Systems", *Proceedings IEEE Virtual Reality*, 2002.
Gabbard et al., "Usability Engineering: Domain Analysis Activities for Augmented Reality Systems", *The Engineering Reality of Virtual Reality 2002*, Proceedings in SPIE vol. 4660,Feb. 2002.
Hollerer et al., "User Interface Management Techniques for Collaborative Mobile Augmented Reality", Computers and Graphics 25(5), Oct. 2001.
Azuma et al., "Recent Advances in Augmented Reality", *IEEE Computer Graphics and Applications*, vol. 21, Issue 6, Nov./Dec. 2001.
Julier et al., "Information Filtering for Mobile Augmented Reality", *IEEE Computer Graphics and Applications*, vol. 22, Issue 5, Jul. 2, 2002.
"EverQuest: Shadows of Luclin", Sony Online Entertainment, Game Manual 2001.
Piekarski et al., "The Tinmith System—Demonstrating New Techniques for Mobile Augmented Reality Modeling", *Australian Computer Science Communications*, Jan. 2002.
Piekarski et al., "Tinmith-Metro: New Outdoor Techniques for Creating City Models with an Augmented Reality Wearable Computer," Proceedings Fifth International Symposium on Wearable Computers, 2001.
Piekarski et al., "Integrating Virtual and Augmented Realities in an Outdoor Application", *Proceedings 2$^{nd}$ IEEE and ACM International Workshop on Augmented Reality* (IWAR '99), 1999.
Piekarski, "Interactive 3D Modelling in Outdoor Augmented Reality Worlds," Wearable Computer Lab, Feb. 2004.
U.S. Pat. No. 6,767,287.
Julier et al., "BARS: Battlefield Augmented Reality System", *Advanced Information Technology Naval Research Laboratory*, Oct. 2000.
U.S. District Court Northern District of California San Francisco Division; *Barbaro Technologies, LLC v. Niantic, Inc.*, Case No. 3:18-cv-02955-RS, Niantic's Notice of Motion and Rule 12(c) Motion for Judgement on the Pleadings of Invalidity Under 35 U.S.0 101, filed Apr. 23, 2020.
"Microsoft Flight Simulator 2004, a Century of Flight", Sybex Official Strategies and Secrets, Microsoft Game Studios and Sybex User Manual, Copyright 2003.
"History of Microsoft Simulator", *Wikipedia*, retrieved from the Internet: https://en.wikipedia,org/wiki/History_of_Microsoft_Flight_Simulator on May 11, 2020.
NPSNET: Flight Simulation Dynamic Modeling Using Quaternions, Calhoun: The NPS Institutional Archive DSpace Repository, 1994, Cooke, Joseph M. et al.
U.S. District Court, Northern District of California, San Francisco Division; *Barbaro Technologies, LLC v. Niantic, Inc.*, Case No. 3:18-cv-02955-RS, Order Granting Motion for Judgement on the Pleadings of Invalidity Under 35 U.S.C. § 101, filed May 21, 2020.

* cited by examiner

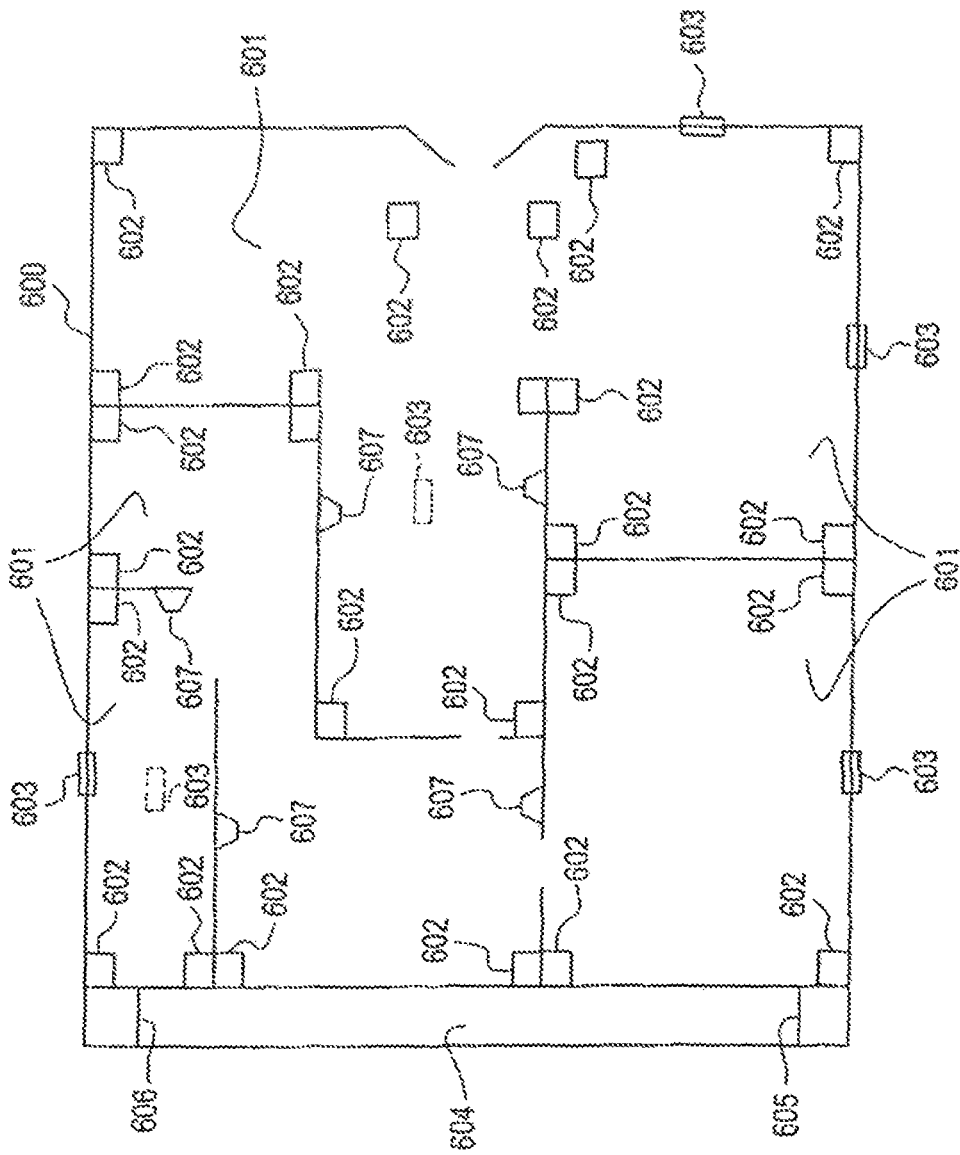

US 10,846,941 B2

INTERACTIVE VIRTUAL THEMATIC ENVIRONMENT

INCORPORATION BY REFERENCE

The present application is a continuation of U.S. patent application Ser. No. 15/348,438, filed on Nov. 10, 2016, which is a continuation of U.S. patent application Ser. No. 13/137,299, filed on Aug. 4, 2011, now U.S. Pat. No. 10,255,724; which is a divisional application of U.S. patent application Ser. No. 12/073,967, filed on Mar. 12, 2008, now U.S. Pat. No. 8,225,220; which is a divisional application of U.S. patent application Ser. No. 10/805,415 filed Mar. 22, 2004, now U.S. Pat. No. 7,373,377; the contents of all of which are herein incorporated by reference. The present application also incorporates by reference U.S. patent application Ser. No. 10/272,408, filed Oct. 16, 2002.

DESCRIPTION

Background of the Invention

1. Field of the Invention

The present invention relates to an interactive software application platform which can be used in entertainment, business, publishing, and other applications to provide a virtual and real world experience to the user by integrating audio, video, two dimensional (2D), and three dimensional (3D) technology, and other applications or services.

2. Description of the Related Art

Virtual environments are increasingly of interest to users for entertainment (i.e., games) and educational purposes. Based on this increase, the business world is finding new ways to access users through the virtual environments, for product placement and to offer services. In addition, the use of virtual environments to illustrate medical procedures etc., or for business training purposes, are used routinely.

However, the virtual environments, especially those present on the internet, for example, have not provided the user with a real world experience. Accordingly, a way to integrate audio, video, 2D, and 3D technology in order to maximize the real world experience for the user, is desired.

SUMMARY OF THE INVENTION

The present invention is directed to an interactive software application platform which can be used in entertainment, business, publishing, and other applications to provide a virtual and real world experience to the user by integrating audio, video, two dimensional (2D), and three dimensional (3D) technology, and other applications or services.

In one embodiment consistent with the present invention, a method of integrating real-time information into a virtual thematic environment using a computer system, includes downloading real-time information from a source external to the virtual thematic environment; inserting real-time information into the virtual thematic environment; and providing access to the real-time information to a user within the virtual thematic environment.

In another embodiment consistent with the present invention, the real-time information is at least one of audio, video, chronological, text, and GPS, and the real-time information is provided to the user via a mobile device.

In another embodiment consistent with the present invention, the real-time information is product placement information from a sponsor.

In another embodiment consistent with the present invention, the external source is the internet and the real-time information is retrieved via cable or satellite.

In another embodiment consistent with the present invention, the user is provided with mini-applications within the virtual thematic environment which operate in real-time with real-time information.

In another embodiment consistent with the present invention, the real-time information is language translation.

In another embodiment consistent with the present invention, the virtual thematic environment is holographically projected.

In another embodiment consistent with the present invention, a method of integrating information into a virtual thematic environment using a computer system, includes accessing a database where the information is stored; retrieving the information from the database; inserting the information into the virtual thematic environment; and displaying the information to a user within the virtual thematic environment.

In another embodiment consistent with the present invention, the virtual thematic environment is a game.

In another embodiment consistent with the present invention, a method of providing product placement in a virtual thematic environment using a computer system, includes retrieving information on a sponsored product from a database where product information is stored; and displaying the sponsored product within the virtual thematic environment.

In another embodiment consistent with the present invention, the method further includes providing a selection mechanism to a user such that the product can be accessed by use of the selection mechanism; and automatically providing the product information on the product to the user after selection of the product.

In another embodiment consistent with the present invention, automatically providing the product information includes the step of: automatically directing the user to a website which provides information on the product.

In another embodiment consistent with the present invention, the method further includes returning the user to the virtual thematic environment at a point where the user left the virtual thematic environment.

In another embodiment consistent with the present invention, the method further includes tracking movements and purchases of the user at each website visited by the user and within the virtual thematic environment.

In another embodiment consistent with the present invention, the computer system of the present invention has a program for integrating real-time information into a virtual thematic environment, including means for downloading real-time information from a source external to the virtual thematic environment; means for inserting the real-time information into the virtual thematic environment; and means for providing access to the real-time information to a user within the virtual thematic environment.

In another embodiment consistent with the present invention, the computer system of the present invention has a program for integrating information into a virtual thematic environment using a computerized system, including means for accessing a database where the information is stored; means for retrieving the information from said database; means for inserting the information into the virtual thematic environment; and means for displaying the information to a user within the virtual thematic environment.

In another embodiment consistent with the present invention, the computer system of the present invention has a program for providing product placement in a virtual thematic environment using a computerized system, including means for retrieving information on a sponsored product from a database where product information is stored; and means for displaying the sponsored product within the virtual thematic environment.

In another embodiment consistent with the present invention, the computer system of the present invention integrates real-time information into a virtual thematic environment, and includes at least one memory containing at least one program including the steps of: downloading real-time information from a source external to the virtual thematic environment; inserting said real-time information into the virtual thematic environment; and providing access to the real-time information to a user within the virtual thematic environment; and at least one processor for running the program.

In another embodiment consistent with the present invention, the computer system of the present invention integrates information into a virtual thematic environment, and includes at least one memory having at least one program including the steps of: accessing a database where the information is stored; retrieving the information from said database; inserting the information into the virtual thematic environment; and displaying the information to a user within the virtual thematic environment; and at least one processor for running the program.

In another embodiment consistent with the present invention, the computer system of the present invention provides product placement in a virtual thematic environment, including at least one memory having at least one program including the steps of: retrieving information on a sponsored product from a database where product information is stored; and displaying the sponsored product within the virtual thematic environment; and at least one processor for running the program.

In another embodiment consistent with the present invention, a method of integrating holographic images into a virtual thematic environment using a computerized system, includes displaying images from a virtual thematic environment; and projecting the images as holographic projections using a holographic projection system.

In another embodiment consistent with the present invention, the method further includes integrating audio and video into the holographic projections.

In another embodiment consistent with the present invention, the method further includes integrating real-time information into the virtual thematic environment.

In another embodiment consistent with the present invention, the method further includes tracking a location of a user within the holographically projected virtual thematic environment.

In another embodiment consistent with the present invention, the tracking is performed using a GPS system.

In another embodiment consistent with the present invention, the method further includes integrating at least one of a voice recognition system, a synthetic smell system, a weather system, and a GPS system into the holographically projected virtual thematic environment.

In another embodiment consistent with the present invention, a computer system having a program for integrating holographic images into a virtual thematic environment using a computerized system, includes means for displaying images from a virtual thematic environment; and means for projecting the images as holographic projections using a holographic projection system.

In another embodiment consistent with the present invention, a computer system for integrating holographic images into a virtual thematic environment using a computerized system, includes at least one memory having at least one program including the steps of: displaying images from a virtual thematic environment; and projecting the images as holographic projections using a holographic projection system; and at least one processor for running the program.

In one embodiment consistent with the present invention, an apparatus for providing holographic images into a virtual thematic environment, includes a computer system which runs a program including displaying images from a virtual thematic environment; and a holographic projection system which projects the virtual thematic environment as holographic images.

In another embodiment consistent with the present invention, the apparatus further includes an integration of at least one of audio, video, a voice recognition system, a synthetic smell system, a weather system, and a GPS system into the holographically projected virtual thematic environment.

In another embodiment consistent with the present invention, the apparatus further includes a plurality of sensors to track movement of a user within the virtual thematic environment.

In another embodiment consistent with the present invention, real-time information is integrated into the virtual thematic environment.

In another embodiment consistent with the present invention, a computer system having an interactive software application platform for providing a virtual thematic environment, includes at least one thematic/publishing logic module which contains virtual thematic environment rules; at least one digital content library module which provides content management on the virtual thematic environment; and at least one quantum imaging environment (QIE) module which interprets content such that the content is manipulated and accessed by any device.

In another embodiment consistent with the present invention, the system further includes at least one graphical user interface (GUI) module; at least one business logic module directed to accounting, sponsor and users, transactions, and collecting content in real-time and injecting the content into the virtual thematic environment; and at least one data storage.

In another embodiment consistent with the present invention, the system further includes at least one communication module which provides access to various network services and connection options.

In another embodiment consistent with the present invention, a computer system for providing a virtual thematic environment, includes at least one memory having at least one program including the steps of: retrieving information on the virtual thematic environment; inserting said information into the virtual thematic environment; and displaying the information to a user within the virtual thematic environment; and at least one processor for running the program.

In another embodiment consistent with the present invention, there is a computer-readable medium whose contents cause a computer system to integrate real-time information into a virtual thematic environment, the computer system having a program including the steps of: downloading real-time information from a source external to the virtual thematic environment; inserting the real-time information into the virtual thematic environment; and providing access to the real-time information to a user within the virtual thematic environment.

In another embodiment consistent with the present invention, there is a computer-readable medium whose contents cause a computer system to integrate information into a virtual thematic environment, the computer system having a program including the steps of: accessing a database where the information is stored; retrieving the information from the database; inserting the information into the virtual thematic environment; and displaying the information to a user within the virtual thematic environment.

In another embodiment consistent with the present invention, there is a computer-readable medium whose contents cause a computer system to provide product placement in a virtual thematic environment, the computer system having a program including the steps of: retrieving information on a sponsored product from a database where product information is stored; and displaying the sponsored product within the virtual thematic environment.

In another embodiment consistent with the present invention, there is a computer-readable medium whose contents cause a computer system to integrate holographic images into a virtual thematic environment, the computer system having a program including the steps of: displaying images from a virtual thematic environment; and projecting the images as holographic projections using a holographic projection system.

In another embodiment consistent with the present invention, an apparatus for providing holographic images into a virtual thematic environment, includes a computer system which runs a program including displaying images from a virtual thematic environment, the computer system including: at least one thematic/publishing logic module which contains virtual thematic environment rules; at least one digital content library module which provides content management on the virtual thematic environment; and at least one quantum imaging environment (QIE) module which interprets content such that the content is manipulated and accessed by any device; a holographic projection system which projects the virtual thematic environment as holographic images; and at least one of audio, video, a voice recognition system, a synthetic smell system, a weather system, and a GPS system into the holographically projected virtual thematic environment.

In another embodiment consistent with the present invention, an apparatus for providing holographic images into a virtual thematic environment, includes a room containing a plurality of display screens; a computer system which runs a program including displaying images from a virtual thematic environment, the computer system including: at least one thematic/publishing logic module which contains virtual thematic environment rules; at least one digital content library module which provides content management on the virtual thematic environment; and at least one quantum imaging environment (QIE) module which interprets content such that the content is manipulated and accessed by any device; a projection system which projects the virtual thematic environment as images on the displays screens; and a user-accessible control panel which provides access to the computer system.

In another embodiment consistent with the present invention, an apparatus for providing holographic images into a virtual thematic environment, includes a room containing a plurality of sensors for at least tracking movement of a user through said room; a computer system which runs a program including displaying images from a virtual thematic environment, the computer system including: at least one thematic/publishing logic module which contains virtual thematic environment rules; at least one digital content library module which provides content management on the virtual thematic environment; and at least one quantum imaging environment (QIE) module which interprets content such that the content is manipulated and accessed by any device; and a holographic projection system which projects the virtual thematic environment as holographic images in the room.

Thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 7 is a schematic showing a warehouse environment according to one embodiment of the interactive software platform consistent with the present invention.

DETAILED DESCRIPTION OF THE INVENTION

Figure 1:
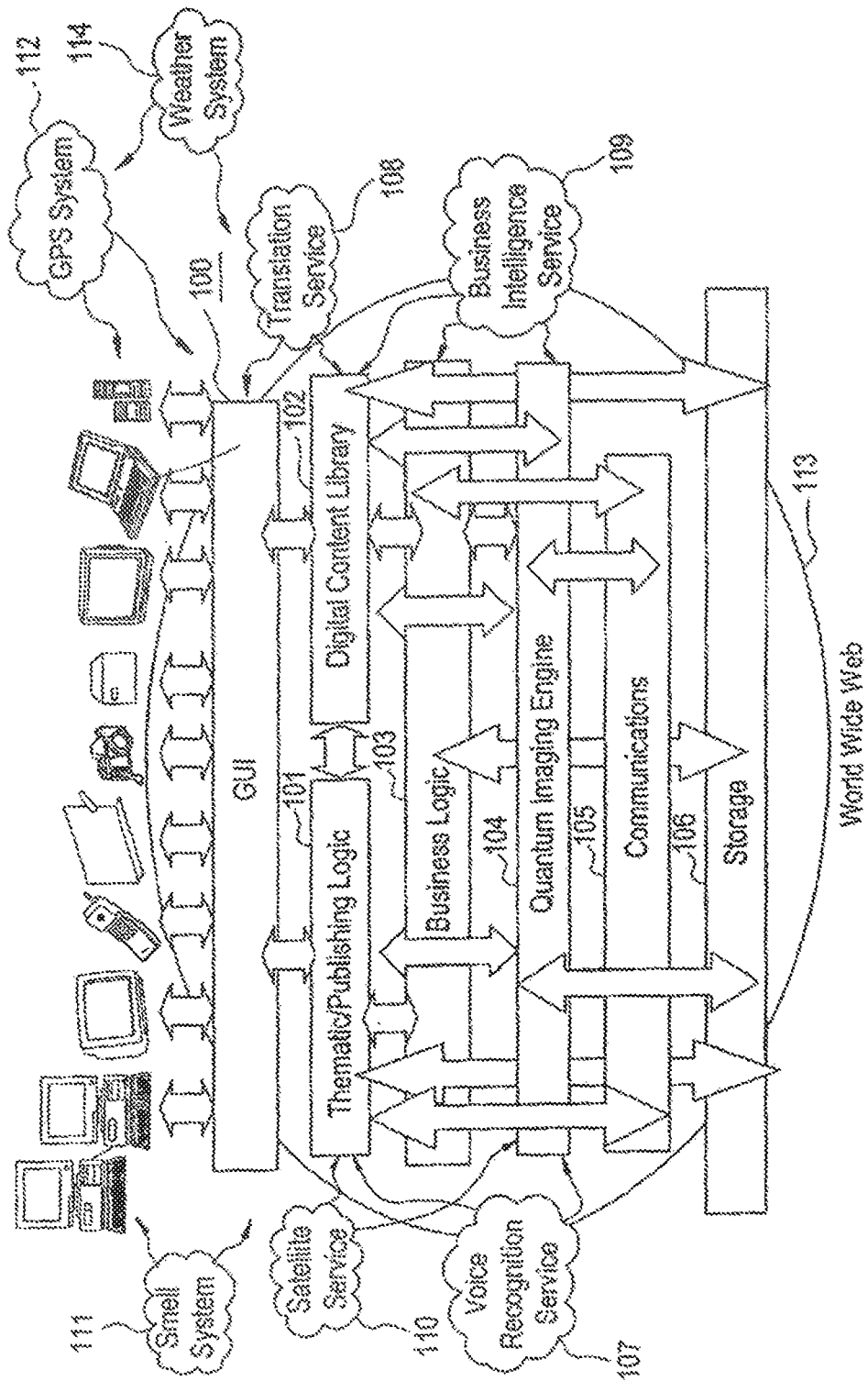
FIG. 1 is a schematic showing one embodiment of the six-level logical architecture of an interactive software platform consistent with the present invention.

The present invention relates to an interactive software application platform which can be used in entertainment, business, publishing, and other applications to provide a virtual and real world experience to the user by integrating audio, video, 2D and 3D technology, and other technologies that may enhance the user's experience. In particular, the program of the present invention injects real time data, such as sports scores, live sports events, film, news, etc., into a virtual thematic environment which includes both audio and video, and also integrates mini-applications, such as word processing, mutual fund calculators, spreadsheets, static purchasing (i.e., static e-commerce applications, and any other type of application that can be scaled or as a demo), e-mail, and the like, into the virtual thematic environment, without a noticeable delay. The present system can be both a rich graphic environment, and may also include a holographic system and technology, mirror imaging technology, and high-level algorithms. The present invention can provide a virtual 2D and/or 3D environment, which can include not just audio, music and video, but sensitivity to touch, the sensing of odors etc., so that the user can experience a real world environment in which the user can move through in real-time.

In one embodiment consistent with the present invention, a thematic computerized environment, such as the gaming environment described in U.S. patent application Ser. No. 10/272,408, can be accessed by one or more users over the internet. The user enters the thematic environment, whether it is a game, or a particular website, such as a museum website, store, school, hospital etc., and is taken into a 3D virtual world.

For example, in the gaming environment, the 3D world can be sectioned into unique "zones" which could be geographic, related to hobbies, interest groups, or a specific game genre. In a geographic environment, for example, the program would request that the user choose a city, and the program would take the user to a starting point in that city. Real world photographs, including satellite photographs, video, and/or 2D and/or 3D graphics would provide the cityscape. Once the user, whether in first person or third person view, is at the starting point at a particular city street, the program would allow the user to move through the 2D and/or 3D and/or integrated graphical representation of the actual real world environment and interact with it.

Since product placement is one feature consistent with the present invention, as described in U.S. patent application Ser. No. 10/272,408, the storefronts viewed by the user at the starting point on a city street, for example, could be representations of actual stores, such as coffee stores, bookstores, etc., which are "rented" by the corporate sponsors. If the user decides to "enter" a bookstore by using the mouse to "hot click" on the bookstore front, for example, or by any other selection means (i.e., voice recognition mechanism, keyboard, etc.), the program can automatically direct the user to the bookstore website, where the user may purchase books, look up information and or "grab" an item to be used in the game, or gain intelligence on those products or informational data etc. The program will provide the user with an icon, URL address etc., so that the user can return to the virtual world when desired.

Alternatively, the user may "enter" a coffee store and the program will provide a representation of the actual store to the user. If the user "hot clicks" the mouse, for example, on a particular item, such as a bag of ground coffee, the user can be directed to the coffee store or coffee manufacturer website, for example, for product information and purchasing information.

Although storefronts have been discussed above with respect to product placement, product placements within the virtual environment are not just with respect to real estate, but can be any type of real world item visible or accessible to a user, whether passive or interactive. For example, passive advertising or product placement is the use of billboards, banners, storefronts or restaurant fronts. Interactive product placement includes experiencing the product itself in the virtual world (i.e., taking and reading a newspaper from a newspaper machine, or a magazine from a magazine stand, driving an automobile parked on the street, turning on a radio to listen to a particular radio station, typing into a computer, using a PDA, turning on a TV set, flying in or piloting an aircraft, etc.).

As stated above, in the interactive product placement, the user can "hot click" on an automobile on the street, for example, and then the program will direct the user to a real world website, such as the automobile manufacturer's sponsored website, to review the latest car models, or even make a purchase. As stated above, the user can return to the virtual world via an icon, URL address, etc., to recommence in the virtual world, at the moment the user left the environment for the sponsored website.

While at the sponsor's website, the program may initiate the user to perform certain actions (i.e, visiting certain sites, being first at those sites, following certain directions, completing an educational or informational quiz, participate in an auction etc.) before returning to the virtual world, and before advancing in that world (i.e., before advancing in game play, if the virtual world is a game). Another example of actions initiated at the sponsored website and/or throughout the thematic application, such as a game, are the listing and answering of clues, etc. A timing mechanism can be added to the program such that these actions must be performed within a certain period of time or on a competitive level with one or more opponents (other users).

Depending upon the sponsors, and the thematic storyline, the points that are achieved at the sponsored website for the required actions, can be redeemed for cash rewards, prizes, coupons etc., either at the sponsor's website, and at other websites in the real world (i.e., to obtain concert tickets, clothing etc.), or within the virtual world environment.

The user is not only required to use real world credit cards to purchase items at sponsored websites accessed through the virtual world environment, but may also be directed by the program to either a real world or a virtual world store to purchase items needed within the virtual world (i.e., supplies needed in a game environment), using a virtual credit card.

The program keeps statistical information on all the sites accessed by the user, purchases made, and tracks movement within the thematic environment and real-world websites, etc., so that the sponsors can be provided with statistical data on the users for marketing purposes.

In another embodiment consistent with the present invention, the virtual environment can be a travel website, for example, such that when the user accesses different cities, the program can take the user to that city so that the user can have the real world experience of walking down a street and seeing the actual buildings that would be represented in the real world environment. The user may be able to enter a building in a thematic environment such as a store, hotel, or museum and can view the surroundings as if walking through the real world building. The user may be able to "enter" a museum gift shop, for example, using a selection means (i.e., hot click using a mouse, voice recognition etc.), and then the program may direct the user to the website of the museum gift shop such that the user may make real world purchases, for example.

In other applications which integrate audio and video into the virtual thematic environment, the user may "enter" a store, for example, and be able to choose a DVD or a CD, and make a particular video or musical selection, and the program will show the video in the virtual thematic environment and play the audio over the user's computer system. Thus, the user may be able to watch films, movies, etc. on a screen, for example, within the thematic environment. It is also a part of the present invention that TV programs, videos, etc., are available and running within the thematic environment, and visible to the user, without any interaction from the user.

Thus, the user can choose to change the TV program being shown, or the music being played in the thematic environment, by accessing the options available (i.e., displayed on the screen). The choice of TV program or music, etc., may be through corporate sponsorship (i.e., product placement) and thematic environment setup for that particular geographic location.

In other applications, the user may "hot click" on a poster or a static photo, and the program will access a database to show the subject of the poster or photo (for example, a rock band, models in a fashion show, sports figures, racing cars, etc.) in a video, or other 3D action.

Further, in another embodiment consistent with the present invention, the user may keep, for example, a radio, Global Positioning System (GPS), clock, Personal Digital Assistant (PDA), and other devices on the user's desktop while the user is interacting with the thematic environment. Each of these devices can be turned on/off or removed by the user from the main viewing screen, or enlarged on the screen, when desired.

In another embodiment consistent with the present invention, the virtual thematic environment can interface with a GPS system, which will show the user a map showing the user's (or any other) location, and provide details down to street and house. The program will allow the user to view either real world satellite maps/street photographs, etc., or a virtual representation of the same, showing buildings, grounds, landmarks etc. The user, in a tie-in with the product placement and other information, can "hot click" on a building, for example, and information, such as description, telephone number, directions, sponsored information etc., can be provided on that building.

In other integrations between real world and virtual world environments which take place in real time, real time data is downloaded by the program and provided to the user in the virtual environment. For example, real time information, such as sports scores, stock prices, and auction information, can be provided in an appropriate manner in the virtual thematic environment (i.e., on TV screens, computer screens, by cell phone etc.). In addition, the program allows real time video to be received and viewed in the virtual environment, such as TV programs, sports games, film concerts, etc., from satellite and cable systems. Thus, in an integration of real world and virtual world environments, the user may enter a room where he can "hot click" on a radio, for example, and choose a particular radio station, and the program will allow real-time audio of that radio station to play for the user.

In another embodiment consistent with the present invention, the user can compete in real-time in a gaming environment, for example, with other players others around the world. All the players will have their own internet connections, be logged onto a world server or a set of servers with a unique account and password, and will be able to interact with one another in the thematic environment on a real-time basis. Each player will receive dynamic content (i.e., information in real time) based on the other players' actions. For example, the other players may be directed to "pick someone's pocket" by "grabbing" an object from their competitor, and may gain points by getting to a certain location first, by opening and reading certain information first, or by "hot clicking" on an item first, to obtain points etc.

The present invention also provides the feature of allowing "mini-applications" to be accessible within the virtual world such that the user can utilize word processing programs, e-mail, spreadsheets, attend and participate in an auction, etc. In addition, these mini-applications, such as e-mail, chat rooms, video messaging, are performed by the program in real time, without a noticeable delay to the user.

The program is also designed to provide real time translations into multiple languages within the virtual environment, so that the virtual environment is international in accessibility.

In another embodiment consistent with the present invention, the thematic application can be presented in a holographic environment. In one example of a thematic application in a holographic environment, a "cinematic room" can be provided, housing large non-intelligent display screens or digital displays, plasma screens, LCD or intelligent screens/displays or the like, and chairs or other seated- or standing-accessible structures with embedded controllers. The computer system or film recorder projects images onto the display screen and the images can be manipulated via the embedded controls in the chair or through the voice recognition systems located therein or those found in a separate unit similar to a head piece, microphone, 3D helmet etc. The user may also experience the images in a 3D environment via the use of 3D goggles or other 3D devices.

In another embodiment consistent with the present invention, the interactive software application of the present invention can be connected to a holographic projection system in a gaming environment, for example. The system of the present invention could be set up in a warehouse environment, such that the holographic projections can be viewed in full size, or on a smaller scale. When the virtual world is activated, the user will be able to walk through the environment, such as a geographic zone, and images would be projected from a particular street for the user to view and interact with.

For example, in a holographic embodiment, the user may be presented with a holographic life-size image of a singer, and the program will allow the user to experience the audio and video of that singer as if the user were attending an actual concert by the singer.

In addition, the program would allow the virtual thematic environment to react to the presence of the user. For example, in a holographic environment, the program would show holographic images of the streets of New York City, and if those holographic images are disrupted by the touch of the user, this disruption would be sensed by the program, and the program would change the image appropriately (i.e., the user touches a door to enter through it into a store, and a sensor notifies the computer system of the present invention, of the disruption in the holographic image, wherein the program changes the images projected to show the inside of the store).

In another embodiment of the holographic application, a GPS system may be connected to the computer software of the present invention, which would allow the user to see a change in environment as the user physically "walks" or moves a 3D representation (i.e., avatar) through the environment. The program may initiate automatic updates to change the environment viewed by the user, as appropriate. The GPS system can be provided in all applications for the user to access, as stated above, whether in a thematic environment on a computer screen, or in a holographic application. The data that is provided by the GPS system is recorded and the program will provide that data in a business intelligence format to sponsors for marketing purposes.

In an educational scenario, the program could project historical events as holographic images, and the user can walk through the virtual environment and experience the historical drama of the event in a first-hand way. The user could also experience other events, such as virtually "traveling through space", whether flying a virtual aircraft, or traveling through the solar system, etc., in a real-world manner. In business applications, for example, a user could use the holographic projection system to view real estate before purchasing, etc. In medical applications, the program could allow doctors to see a virtual holographic operation, in order to advise on the conduct of certain medical procedures from a remote site, etc.

In a consumer-oriented sense, holographic images of a user can be displayed so that the user can try on clothing without ever going to a store. Books and magazines could be put into holographic images so that they are "living books". Concerts could be holographic images tied in with audio so that the user has a real-world experience of the musicians and the music. In other applications, the user may be able to view holographic images for online dating purposes, to learn dance steps from a holographic dance teacher, etc.

The present invention can also be integrated with a synthesized smell device, which can output odors such as smells for ingredients in a virtual cooking class, for example. This synthesized smell device and the present invention can be connected via the internet and currently available supportive devices.

The present invention can also be integrated with a virtual weather system (i.e., for fog, wind, or rain etc.), which can output weather patterns in a virtual environment. In a holographic environment, the virtual weather system can be tied to real-world fog or rain-producing systems such as those used on movie sets, so that a walk through a holographic thematic environment could include the actual experience of fog or rain etc.

The sheer number of applications is limitless, and it can be seen that one of ordinary skill in the art would be able to apply the basic technology of the present invention to almost any virtual or holographic environment to advance a user's thematic application experience.

Logical Architecture

The present invention is implemented in software which can be provided in a client, client and server environment, or in a distributed system over a computerized network (the physical architecture is described below), or embedded in a controller that activates both the computer system and/or other devices.

In particular, the program of the present invention is in a Quantum Imaging Environment (QIE). Thus, the logical architecture of the virtual platform of the present invention is implemented on a 6-tier modular system (i.e., six layers), and at least six (6) service area modules, which are fully distributed across the internet (see FIG. 1).

The six layers of the virtual platform include 1) a graphical user interface (GUI) 100, 2) a Thematic/Publishing Logic 101 and a Digital Content Library 102, 3) a Business Logic 103, 4) a thematic or zone application builder and interpreter (i.e., a Quantum Imaging Engine 104), 5) Communications 105, and 6) a Data Storage 106. Each level of the 6-tier system is designed around Open Source technologies, but can include custom software developed in an open standards environment. By using Open Source and proprietary technologies with generic APIs, the present invention is scalable as the numbers of users increase, and the advances can be programmed as Open Source technologies.

The six service area modules of the logical architecture of the virtual platform include 1) voice recognition 107, 2) language translation services 108, 3) business intelligence 109, 4) satellite transmission 110, (5) a synthesized smell system 111, and (6) a GPS system 112, fully distributed across the world wide web (WWW) 113. A weather system 114, can also be provided as another service area module.

Additional services are a subset of the Business Logic module, and include e-mail, chat, order entry, purchasing, billing, and sponsor fulfillment modules.

The virtual platform of the present invention may use the support of PCs, or any other type of hardware that can support specific tasks at the Business Logic and Thematic Logic levels. This may take the form of Grid, Artificial Intelligence (AI), or other technology advanced servers, or the entire system may be hosted on a very high level supercomputing system that can calculate very complicated algorithms and manage all processes supporting well over millions of users simultaneously.

In particular, the present invention may be used in a client-server context, or may be a distributed system across a number of client systems. Thus, in the present invention, a particular operation may be performed either at the client or the server, at the edge of a network or at the center, or both. Therefore, at either the client or the server, or both, corresponding programs for a desired operation/service are available.

In a client-server environment, at least one client and at least one server are each connected to a network such as a Local Area Network (LAN), Wide Area Network (WAN), and/or the Internet, over a communication link. The steps in the methods consistent with the present invention are carried out at the client or at the server, or at both, the server (if used) being accessible by the client over for example, the Internet using a browser application or the like.

Note that at times the system of the present invention is described as performing a certain function. However, one of ordinary skill in the art would know that the program is what is performing the function rather than the entity of the system itself.

The physical architecture of the present invention may include at least one co-located hosting site having racks containing server hardware blades running operation systems, and other necessary applications. The present application's co-located hosting sites may be deployed at two additional locations, providing full geographic diversity. These sites may be near major private or public peering points. The server hardware blades may be connected to storage devices using network attached storage (NAS); but could also be a combination of local disks and a Storage Area Network (SAN), and redundant Gig-E connectivity. The racks may be connected to the co-location hosting providers switches providing direct connectivity to the Internet or contained. The present application co-location site may be fully redundant with multiple egress paths to the Internet. Interaction with the corporate sponsors and active users may be through secure and non-secure internet connectivity.

If there are separate administrative servers for billing and general customer care, they may be maintained in physically separate locations from the main servers.

The underlying technology allows for replication to various other sites. Each new site can maintain "state" with its neighbors so that in the event of a catastrophic failure, other server systems can continue to keep the application running, and allow the system to load-balance the application geographically as required.

Physical Architecture a. Client System

As stated above, the client may be a PC, a mobile terminal, such as a mobile computing device, a mobile phone, or a mobile data organizer (PDA), operated by the user accessing the program remotely from the client (see FIG. 1), or any other digital device that has a screen and storage.

The client computer typically includes a processor as a client data processing means, the processor including a central processing unit (CPU) and an input/output (I/O) interface, a memory with a program having a data structure, all connected by a bus, as well as an input device or means, a display, and may also include a secondary storage device. The bus may be internal to the client and may include an adapter to a keyboard or input device or may include external connections.

The processor at the client may be internal or external thereto, and executes a program adapted to predetermined operations. The processor has access to the memory in which may be stored at least one sequence of code instructions comprising the program and the data structure for performing predetermined operations. The memory and program may be located within the client or external thereto.

The program can include a separate program code for performing a desired operation, or may be a plurality of modules, such as those described below, performing sub-operations of an operation, or may be part of a single module of a larger program providing the operation.

The processor may be adapted to access and/or execute a plurality of programs corresponding to a plurality of operations. An operation rendered by the program may be, for example, supporting the user interface, performing e-mail applications, etc.

The data structure may include a plurality of entries, each entry including at least a first storage area that stores the databases or libraries mentioned above with respect to the logical architecture.

The storage device stores at least one data file, such as text files, data files, audio, video files, etc., in providing a particular operation. The data storage device as storage means, may for example, be a database, including a distributed database connected via a network, for example. The storage device may be connected to the server and/or the client, either directly or through a communication network, such as a LAN or WAN. An internal storage device, or an external storage device is optional, and data may also be received via a network and directly processed.

Methods and systems consistent with the present invention are carried out by providing an input means, or user selection means, including hot clickable icons etc., selection buttons, in a menu, dialog box, or a roll-down window of an interface provided at the client, and the user may input commands through a keyboard, pen, stylus, mouse, speech processing means, touch screen, or other input/selection means. The selection means may also be constituted by a dedicated piece of hardware or its functions may be executed by code instructions executed on the client processor, involving a display unit for displaying a selection window and a keyboard for entering a selection, for example.

In methods and systems consistent with the present invention, the client is connected to other clients or servers via a communication link as a client communication means, using a communication end port specified by an address or a port, and the communication link may include a mobile communication link, a switched circuit communication link, or may involve a network of data processing devices such as a LAN, WAN, the Internet, or combinations thereof. The communication link may be an adapter unit capable to execute various communications protocols in order to establish and maintain communication with the server, for example. The communication link may be constituted by a specialized piece of hardware or may be realized by a general CPU executing corresponding program instructions. The communication link may be at least partially included in the processor executing corresponding program instructions.

b. Server System

In one embodiment consistent with the present invention, if a server is used in a non-distributed environment, the server would include a processor having a CPU which is a server data processing means, and an I/O interface, but may also be constituted by a distributed CPU including a plurality of individual processors on one or a plurality of machines. The processor of the server may be a general data processing unit, but preferably a data processing unit with large resources (i.e., high processing capabilities and a large memory for storing large amounts of data).

The server also includes a memory with program having a data structure all connected by a bus. The bus or similar connection line can also consist of external connections, if the server is constituted by a distributed system. The server processor may have access to a storage device for storing preferably large numbers of programs for providing various operations to the users.

The data structure may include a plurality of entries, each entry including at least a first storage area which stores information on the sponsors, for example, but may also have alternative embodiments including that associated with other stored information as one of ordinary skill in the art would appreciate.

The server may be a single unit or may be a distributed system of a plurality of servers or data processing units, and may be shared by multiple users in direct or indirect connection to each other. The server performs at least one server program for a desired operation, which is required in serving a request from the client.

The communication link from the server is preferably adapted to communicate with a plurality of clients.

The server program may relate to providing a number of operations related to thematic applications.

c. Client-Server Environment

Specifically, in one embodiment, the present invention may be presented in a client-server arrangement (see FIG. 3), with a client system 200 including components such as a GUI 201, and which may contain a Quantum Imaging Environment (QIE) 202, and Thematic/Application Publishing Logic Libraries 203. The client system 200 interacts with the server system 205 via an Application Interface 204.

The server system 205 includes a GUI 211 (see FIG. 4), Thematic/Publishing Logic (Engines) 206, a Communications module 207, Business Logic module 208, a Digital Content Library 209, and Data Storage 210, all interfacing with a QIE 211.

The client system 200 includes communications 212 via a wireless service connection 213. The server system 205 includes communications 214 with network/security features, via a wireless server 215, which connects to, for example, satellite 216, voice recognition 217, business intelligence 218, language translation service 219, GPS system 220, and smell system 221. However, one of ordinary skill in the art would know that other systems may be included, such as a weather system, etc.

In particular, with respect to the client system 200, the GUI 201 is a lightweight client application written to run on existing computer operating systems which may be ported to other personal computer (PC) software, personal digital assistants (PDAs), and cell phones, and any other digital device that has a screen or visual component and appropriate storage capability. The GUI 201 contains an engine for providing graphic hardware capabilities, graphic memory and structures, controls graphic object rendering on hardware, creates/manipulates 2D and/or 3D objects, video objects, streaming video, web objects, lines, rectangles, spheres, vectors, matrices, etc., manipulates animation, colors, bitmaps, textures, images, defines coordinate system and defines world boundaries, defines frames, bounding boxes, camera angles and views, lighting and shadowing etc., provides plug-in extensions, user input stream, event triggers, error handling, management of voice, music, and other graphic and voice formats, voice recognition, and translation services drivers.

In particular, the graphics engine of the GUI 201 is responsible for manipulating graphic content including rendering 2D and/or 3D objects, avatars, and background images. The graphics engine of the GUI 201 takes such objects and renders them into a 2D/3D space for display on the output device, or it can display the objects in a system that provides a holographic environment for the manipulation of images. The graphics engine is also responsible for handling lighting, camera positioning, and shading. The graphics engine of the GUI 201 takes into consideration graphic device display capabilities and acceleration features. One side task of the graphics engine of the GUI 201 is to collect user input and provide it to the Thematic/Publishing Logic 206, for example.

The GUI engine 201 pours in real world content rendered in HTML, XML, RDF, and/or QIE-rendering format or any content format. The user interacts completely with the GUI 201, beginning with login, playing the game in a gaming environment, where applicable, in user help, and user subscription renewals. The GUI 201 also interacts or connects to the Thematic/Application Publishing Logic Libraries 203 and an object oriented database management system (ODDBM), and/or content management system. The GUI 201 also has all the data related to the user's manipulation of the selection means, including any keyboard strokes, use of a pen, joystick, interactive goggles, touch screen, or any other interactive hardware component that would allow the user the ability to move objects, people, etc.

Figure 2:
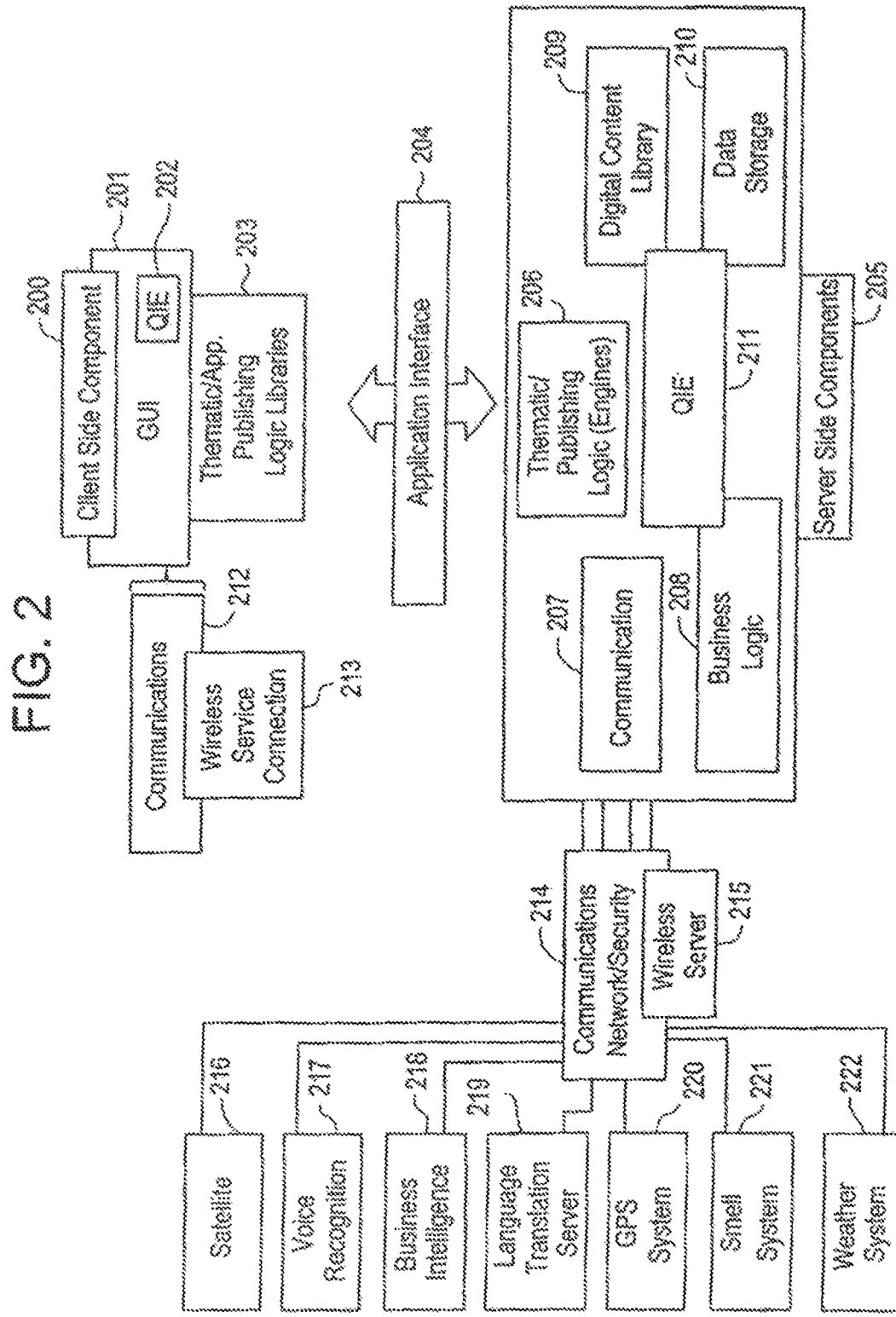
FIG. 2 is a schematic showing one embodiment of the interactive software platform consistent with the present invention, in a client-server arrangement.

The QIE 202/211 is both part of the client and the server components in the embodiment of FIG. 2. The QIE 202/211 includes an interpreter that will allow data to be transmitted to any device, and is the basis for the design structure and layout for applications. The QIE 202/211 allows developers to develop objects and applications from the interpreter. For gaming or other thematic environments, the representation of the layout and design may be in the representation of "zones", and the layout and design may be set up as zones and content, for medical, retail, educational purposes, etc. The QIE 202/211 pertains to the most common denominator—the application architecture, and the content. QIE 202/211 is an interpreter that will take all of the rich content, interpret the information into objects to be manipulated and accessed via any device and place these objects or information in the appropriate format that is designed or will be designed by the developer.

On the server side, the QIE 211 interacts with the Business Logic 208, Digital Content Library 209, Thematic/Publishing Logic 206, Data Storage 210, Communications 207, and via, the Communications/Network/Security 214, to the service modules 216-221. The data may be manipulated in object form or some other form that would be accessed, manipulated and interpreted on any digital device.

Two technologies that may be used in conjunction thereof or separately, to manipulate the data and access the data, are mirror imaging technology and holographic imaging technology. In addition, other technology language-based algorithms can be used in recalculating the content, shapes, graphics, images, music, and video (every type of media), in order that the data can be exposed, manipulated, and accessed on any device.

The Thematic/Application Publishing Logic Libraries 203 on the client system 200, include all the libraries that are needed for the interactive components of the applications such as animation, graphics, artwork, overall content, web content, and utilizes the services of translation, currency, satellite transmission, video, music, synthesized smell, and voice-over libraries. In addition, the Thematic/Application Publishing Logic Libraries 203 contain the profile of the active users, their current states, individual histories, associations between other active users when in a game format (i.e., team members), and associations within the virtual world, such as with non-game characters (i.e., characters within the game).

In addition, the Thematic/Application Publishing Logic Libraries 203 are designed for the sponsors in order to incorporate product placement, video feeds, and mini-applications, web sites, e-commerce, music, voice, and GPS system information into the virtual world. The Thematic/Application Publishing Logic Libraries 203 may also be used for the development of mini-applications that are dictated by the sponsor, and will allow a developer to build a simulated e-mail, spreadsheet, database, and any type of application that is sponsor-based or pertains to the overall thematic application.

The Thematic/Publishing Logic 206 on the server system 205 is accessed through the GUI 201, and contains the environmental game rules. The Thematic/Publishing Logic 206 also ties into the QIE engine 211 and Business Logic 208 layers.

The Thematic/Publishing Logic 206 is the director of all previous components by working with a pre-defined (but modifiable) set of rules and events from objects, and coordinates further actions to be taken as to what will constitute the thematic environments. In particular, the Thematic/Publishing Logic 206 initializes global memory structures, validation of thematic objects and engines, startup procedures for all engines, collects objects for all engines, initializes the default thematic environment, provides user information, interacts and validates the engines' status, provides access and execution to thematic environment rules, controls and creates events from engines, provides state change to all engines, provides scripting language for explicit object modification, and provides shutdown for all engines.

The Thematic/Publishing Logic 206 also interacts directly with the Data Storage 210, obtaining and updating information (i.e., states, profiles and history) on the active users. The Thematic/Publishing Logic 206 will interact with the Digital Content Library 209 and pass information back and forth to the specific subfolders and document management system.

The Thematic/Publishing Logic 209 also ties directly into e-mail or chat systems and other Business Logic 208 applications that are necessary to the thematic applications or which may be used directly in the thematic applications. The Thematic/Publishing Logic 206 will also tie directly to the Business Logic 209 for calculating the time, rewards, points, order, purchase, billing and shipping components. As the Thematic/Application Publishing Logic Libraries 203 need information, the Thematic/Publishing Logic 206 will pull that data from the Business Logic 208 and Digital Content 209 libraries, or the reverse, depending upon the needs of the application environment.

In a gaming environment, the Thematic/Publishing Logic 206 may be programmed to "grab" data/objects from the web to be utilized in the game. Any objects on the web will be "copied and grabbed" by maintaining the original information of the data or objects and will allow the use of that image, while maintaining the data and integrity of the object, within the application.

The Thematic/Publishing Logic 206 may be written in C, C++, C #, Java, and/or Assembler, or any another language that is suited for this type of interaction and/or libraries.

The Digital Content Library 209 ties into the QIE engine 211. The Digital Content Library 209 is a content management application or database that interacts with the Thematic/Publishing Logic 206, that will be laid out into sections or subsets and its own respective groups similar to a filing cabinet (i.e., document management system, for example, Zone 1: USA, Zone 1A: New York, Zone 1A1: New York City, etc.). Within each zone are a subset of data and another subset of data. Each will include, for example, the layout of the streets, buildings, stores, historic locations, rivers, streams, oceans, etc. It will also include the video, music, GPS information, and images relating to each city.

The Digital Content library 209 includes all information such as data, codes, binary files, web content, event notification, and other information. The Digital Content library 209 may also include scheduling directions for when the web site access and identification of where to place the web content or advertising, e-commerce, video, etc. are to be placed.

The Business Logic 208 is tied into the Thematic/Publishing Logic 206 and the Data Storage 210. The Business Logic 208 is made up of several modules, which are directed to: accounting (i.e., ordering, billing, shipping, and payment processing) for both the sponsors and users, including all member information accumulated within the application (i.e., rewards, points, time (based on time zones), stopwatch or timer); creating/maintaining user profile information; a transaction database which tracks business intelligence data, licensing, rewards, points, time, and user info; maintaining a sponsor database of business information; a member database (i.e., order configuration, encryption & compression, library data); electronic messaging (i.e., e-mail, chat, or other applications); and interacts with the Business Intelligence service module 218.

The Business Logic 208 maintains the profiles of the active users, their current states, individual histories, associations between active users (i.e., team members), and associations with non-users (i.e., characters within the thematic virtual world). The Business Logic 208 interacts with the Thematic/Publishing Logic 206 as well as the other layers on an as-needed basis to update the profiling for the thematic applications, as well as information needed for business intelligence reporting.

The thematic virtual world interacts with the sponsors at this layer. The Business Logic 208 collects content from the real world (i.e., content from the sponsor's websites, information on time, weather, late-breaking news, etc.) and injects this content into the thematic virtual world through the Thematic/Publishing Logic 206.

The Business Logic 208 interacts with the Business Intelligence service module 218 for business intelligence data, supplying the information to the sponsor in real time offering all of the latest data which is tracked within the applications. The Business Logic 208 component interacts with the corporate sponsor, providing relevant information (i.e., raw data, canned reports, etc.) to the sponsor on the active user's consumer behaviors, including likes, dislikes, purchases, etc. Maintenance fees for upgrades and updates are automatically sent to the sponsors.

The Business Logic 208 interacts with the Data Storage 210 to update information on the active users, determining what information is relevant today vs. yesterday. The Business Logic 208 ties back into the Thematic/Application Publishing Logic Libraries 203 and then to the zone application builder and interpreter (QIE engine 202/211).

The Business Logic 103 is written in C, C++, C #, Java and/or Assembler, or any other type of language appropriate to achieve the above-described features.

The logical architecture of the present invention is designed to provide future consideration for APIs 204 at the Thematic/Publishing Logic 206 and Business Logic 208 components. Using software development kits (SDKs), corporate sponsors using professional services, are able to make customer modifications to the thematic application or game.

The Data Storage 210 includes distributed databases containing all relevant information on the active user's profile in their current state, history, and real world content. The Data Storage 210 interacts directly with the Thematic/Publishing Logic 206 and the Business Logic 208.

The database tables will be distributed using an appropriate database application that will support grid-based logical architecture or other appropriate database architecture.

The Communications module 207 of the server system 205 can handle a multiplayer network and will use standard internet communications tie into existing libraries or with custom modifications.

The client Communications 212 interface provides access to various network services required to interact with other users (such as a messaging service, system administration service, user/group administration service, chat service, thematic state tracking, and character profile service 214), and controls dynamic features as applied by the central servers. The client Communications 212 may provide alternate connection options, and controls termination of the connections.

The server Communications Network/Security 214 interface, addresses the security of the logical architecture at two levels. The integrity of the active user is maintained, and secure interaction between the system of the present invention and the corporate sponsor is maintained.

The server Communications Network/Security 214 interface provides access to various network services required to interact with other users and control dynamic features as applied by the central servers. The server Communications Network/Security 214 may include maintaining the state of the thematic environment amongst various users, providing anti-cheating mechanisms, providing messaging services between users, and passes information to and from the client applications and other internal server side applications.

The server Communications Network/Security 214 interface may require interaction with the server Business Logic 208. The server Communications Network/Security interface 214 may also require access to other client software during use, and direct access to various database information for performance reasons.

The server Communications Network/Security 214 provides security functions such as user authentication and anti-cheat algorithms, and may also provide methods for secure billing and rewarding systems to users with audit functions. Security is maintained within the virtual environment to ensure that users adhere to virtual world rules. The server Communications Network/Security 214 prevents hackers from accessing, modifying, or corrupting data (i.e., modifying their current state and history or the data of others), thus preventing sabotage for the active user population.

Security is also incorporated using encryption between the Business Logic 208 and the sponsors to ensure that there is no back-door entry into the sponsors' websites, nor that proprietary consumer data is intercepted.

With respect to the service modules 216-221, these modules are state-of-the art systems which are conventionally available.

Figure 3:
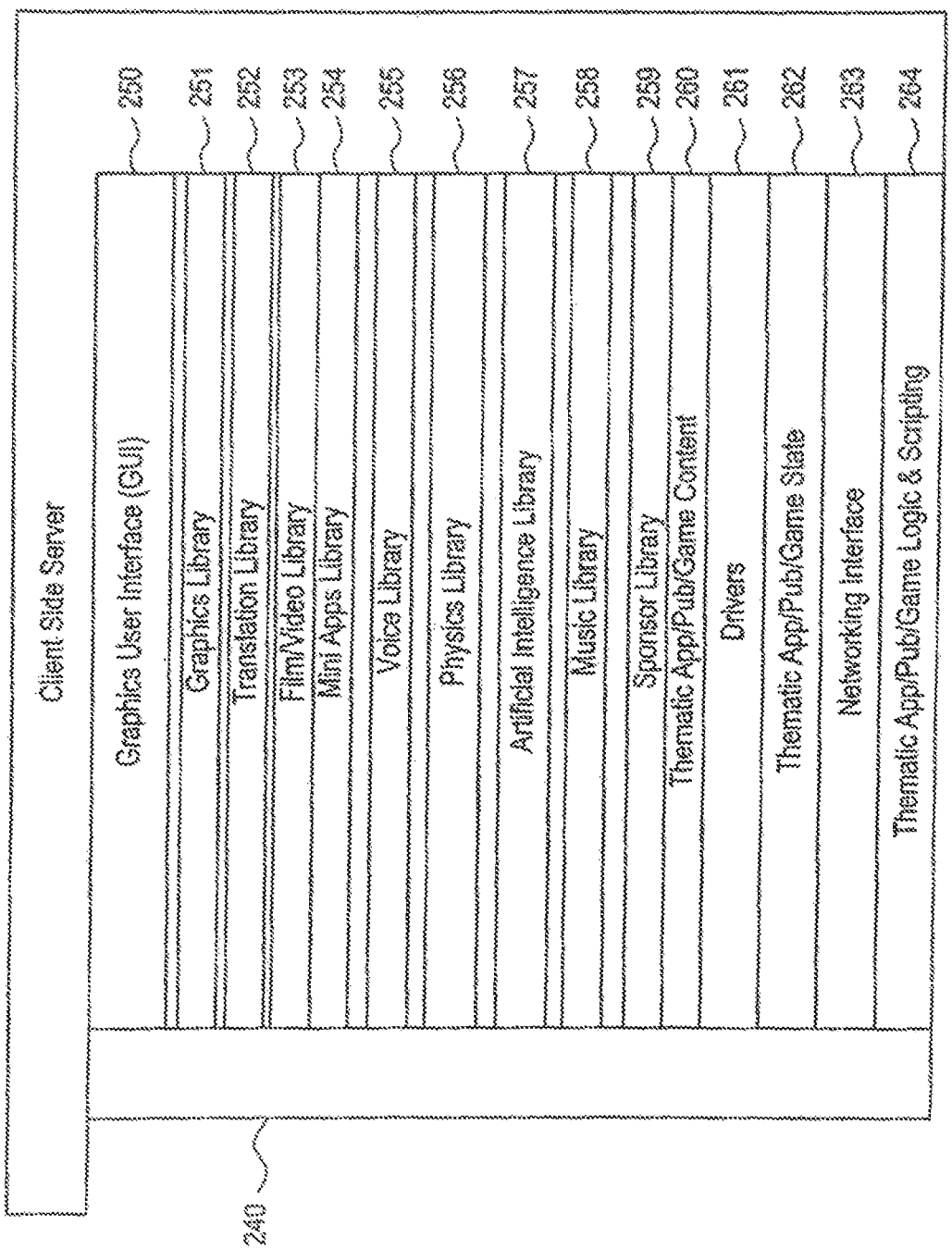
FIG. 3 is a schematic of a client-side server, according to one embodiment of the interactive software platform consistent with the present invention.

In another embodiment consistent with the present invention, the client side system can be a server which, instead of having all the libraries etc. on a component such as the Thematic/Application Publishing Logic Libraries 203 of FIG. 2, instead are all placed on a GUI 250 of client side server 240 (see FIG. 3).

The GUI 250 of the embodiment of FIG. 3 includes a graphics library 251, a translation library 252, a film/video library 253, a mini applications library 254, a voice library 255, a physics library 256, an Artificial Intelligence (AI) library 257, a music library 258, a sponsor library 259, a thematic application/publication/game content library 260, drivers 261, a thematic application/publication/game state component 262, a networking interface 263, and a thematic application/publishing/game logic and scripting component 264.

The graphics component/library 251 is discussed in detail above. The translation library 252, the film/video library 253, mini applications library 254, and a voice library 255, are all related to the engines and/or services associated with the libraries that support both a client, such as a client-server, or server-based model. In this example, the program runs from a client only, which can be connected to a server, but in most cases is limited to the client. In this example, the translation library will include program code that will allow the translation of one language into a different language—for example, Chinese to English. The information or data of the translations will be stored or can be located in the Thematic Application/Publishing/Game Content library 260.

The Film/Video library 253 includes programming code that will allow the present system to re-create and maintain the attributes of a number of film strips or video in its appropriate format using the appropriate code or language(s). The Film/Video library 253 will interact with the GUI 250 and Sponsor Library 259, and possibly the QIE 202 and/or the Graphics library 251 for processing and display through the appropriate drivers 261 to the screen. The information or data will be stored or can be located in the Thematic Application/Publishing/Game Content library 260.

The mini-applications library 254 will consist of programming code to create the appropriate application selected by the user. The mini-applications library will interact with the GUI 250, Sponsor Library 259, and the Graphics library 251 for processing, and possibly the QIE 202 and/or the Graphics library 251 for processing and display through the appropriate drivers 261 to the screen. The information or data will be stored or can be located in the Thematic Application/Publishing/Game Content library 260. The amount of information is determined based on the set of instructions, programming code, and sponsorship.

The Voice library 255 or audio will allow for the programming, and/or generation of the audio particular to a frame or to the 2D/3D images. The Voice library 255 will interact with the GUI 250, Sponsor Library 259 and possibly the QIE 202 and/or the Graphics library 251, and the appropriate drivers 261 will process the information for output. Voice is also used in this sense to take information via a microphone or some type of input device into the system, which is processed through the GUI 250, passed to the QIE for processing and/or to the Voice library 255 for instruction to be passed back to the Graphics library 251 and back through the GUI 250 and drivers 261 to be outputted through a set of speakers or output device. The information or data will be stored or can be located in the Thematic Application/Publishing/Game Content library 260.

The Music engine/library 258 maintains the specifications for the music, music state, and all the properties, data, logic, and rules and programming that are associated with the integration and output of music in the thematic applications. The Music library 258 will allow for the programming, and/or generation of music particular to a frame or to the 2D/3D images. The Music library 258 will interact with the GUI 250, Sponsor Library 259, business logic, drivers, and possibly the QIE 202, and/or the Graphics library 251. After the Music library 258 finds the appropriate piece of music, the program will transfer the data back to the GUI 250 and Drivers 261, to an output device or set of speakers. The information or data will be stored or can be located in the Thematic Application/Publishing/Game Content library 260, or can be pulled from a satellite transmission via the satellite service module. The Music engine may release the memory used upon completion of its task.

Each of the libraries—Translation 252, Film/Video 253, Mini Applications 154, Voice 255, Music 258, and Sponsor 259, will obtain the appropriate information for data, voice, music etc., from the storage area or disk and/or the Thematic Application/Publication/Game content 260, and will maintain all the information for the profiling, "game" state, and business information and tracking, by accessing the Thematic Application/Publication/Game state component 262, and via connecting to the Thematic Application/Publishing/Game Logic and Scripting component 264. The libraries will process the information, voice, data, music, etc. as appropriate or through the QIE, for display on the screen or throughput to the digital devices speaker or speaker system, utilizing the drivers 261 and networking interface(s) 263. This option allows the user the use of the thematic application directly on his/her digital device without connecting to the internet.

The physics engine of the physics component/library 256 controls the behavior of objects as they would be affected by various laws of nature. The physics engine of the physics component/library 256 provides mathematical manipulation to objects as how they would react to gravity, rapid deceleration, and chaotic behaviors. The physics engine of the physics component/library 256 may inform the Thematic Application/Publishing/Game Logic & Scripting component 264 when the object should be changed given the current set of physics logic. The physics engine component/library 256 may interact directly with the Thematic Application/Publishing/Game Logic & Scripting component 264.

The physics engine component/library 256 controls releasing memory, relates physics objects to game objects, provides physics object duplication, maintains the physics object state, and provides data on object modification due to equations and the Thematic Application/Publishing/Game Logic & Scripting 264. The physics engine component/library 256 disables the local physics code when in multi-user mode and assumes those tasks. The physics engine component/library 256 may interact directly with the Thematic Application/Publishing/Game Logic & Scripting 264 for all networked users, and also may rely on a real-time thematic database for partial and context information.

The AI engine component/library 257 interacts directly with the Thematic Application/Publishing/Game Logic & Scripting component 264. For performance reasons, it may also act directly with the Thematic Application/Publishing/Game Content component 260.

The AI engine component/library 257 controls the behavior of objects that exhibit intelligence beyond that of the user's or the thematic environment on the network. The AI 257 may be used to manipulate objects, for example, such as NPCs (non-player characters) when in a thematic/gaming context, animal characters in thematic environments, and simple games within the game. The AI 257 informs the Thematic Application/Publishing/Game Logic & Scripting component 264 when the object should be changed given the current set of AI logic. The AI engine component/library 264 disables local AI code when in multi-user mode, and assumes those tasks. The AI engine component/library 264 may interact directly with the Thematic Application/Publishing/Game Logic & Scripting component 264 for all networked users. The AI engine component/library 264 may also rely on the real-time thematic database for spatial and contextual information.

The AI engine component/library 257 may provide AI object duplication, relates AI objects to thematic environment objects, maintains the AI object state, provides data on object modification due to AI rules and thematic logic, provides secure transport of data to/from clients and servers, receives data from the server, if provided, checks for errors in data, collects thematic environment state information from the client, and makes thematic environment state information available to the Thematic Application/Publishing/Game Logic & Scripting 264, provides messaging services, and real-time file loading services.

The Sponsor library 259 maintains the specifications for the sponsor's product placement, storefronts, state, and all the properties, data, logic, and rules and programming that are associated with the integration and output of the sponsor components or 2D/3D images in the thematic applications. The sponsor library 259 may interact directly with the Thematic Application/Publishing/Game Content component 260, the Graphics library 251, Translation library 252, Film/Video library 253, Voice library 255, Music libraries 258, mini-applications library 254, the business logic, drivers 261, and the QIE. The data may be stored in the data storage, digital content library, or pulled from a satellite transmission via the satellite service module. It will tie directly into the Thematic Application/Publishing/Game Logic & Scripting component 264, and will release the memory used upon completion of its task.

The Thematic Application/Publishing/Game Content component 260 may provide a storage facility for all thematic content required in the virtual environment. Objects may include video, audio, images, rule sets and default values for all objects used in the thematic environment. The Thematic Application/Publishing/Game Content component 260 may also provide multiple methods for accessing the objects and maintains a record of where objects are located. Other tasks may include providing caching of commonly used objects and a method to update objects.

The Thematic Application/Publishing/Game Content component 260 may control releasing memory, initialize data access protocols, provide access to objects on local hardware and remote hardware, caching services, compression services, versioning services, updating of objects, error checking, a framework for sub-AI engines, and error handling.

The Thematic Application/Publishing/Game Content component 260 may interact directly with the client server Thematic Application/Publishing/Game Logic & Scripting component 264, the graphics component 251, AI component 257, as well as the Network Interface 263.

The server drivers 261 are instructions, connections, or translation that allows the input or output of data to be recognized by certain hardware for example a screen, phone, microphone, keyboard, pen, the internet etc.

The server Thematic Application/Publishing/Game state component 262 maintains the state or information of the play. If the character moves to the right and stops, the Thematic Application/Publishing/Game state component 262 tracks the actual movements of what it took to make that character move and stop. If the object is transformed to a different object, the component 262 tracks the steps that it took for that image to be transposed. The Thematic Application/Publishing/Game state component 262 will maintain the exact location of where the thematic application is stopped, such that the user can return to this same spot upon the user's return to the thematic application. The Thematic Application/Publishing/Game state component 262 also maintains the imaging, data, music, voice, film, etc. for that location. However, the content may indeed change depending upon other users/players/etc. and or the update of information that has been added to or removed from the main system on the server. Although the user may be able to return to the same location and begin again, the program may change the quests, questions, object(s), stores, product placement etc.

The server Networking Interface 263 provides access to various network services required to support the server 240, such as a messaging framework, etc., and includes maintaining the server component framework. The server Networking Interface 263 is responsible for extracting in real-time, real world information and normalizing it for the thematic environment. Data sources may consist of XML, SOAP, HTML, FTP, Telnet, or any other commonly available method of data transfer. Normalized rule sets are sent to the server Thematic Application/Publishing/Game Logic & Scripting component 264 for implementation in the thematic environment. The real world Networking Interface 263 is also responsible for maintaining rules that affect the thematic environment when no other real world data is available.

The server Thematic Application/Publishing/Game Logic & Scripting component 264 takes data from a rule set as well as from external sources and modifies the thematic environment. Rules may be static and retrieved from a data source, or they may be dynamically created from an application tool. External rules will come from various sources and will arrive in moralized manner. All real time modifications to the thematic environment may be routed through the Thematic Application/Publishing/Game Logic & Scripting component 264.

In another embodiment consistent with the present invention, the client system may be a basic system, and the server may include all of the components necessary to support the interactive software platform of the present invention.

Figure 4:
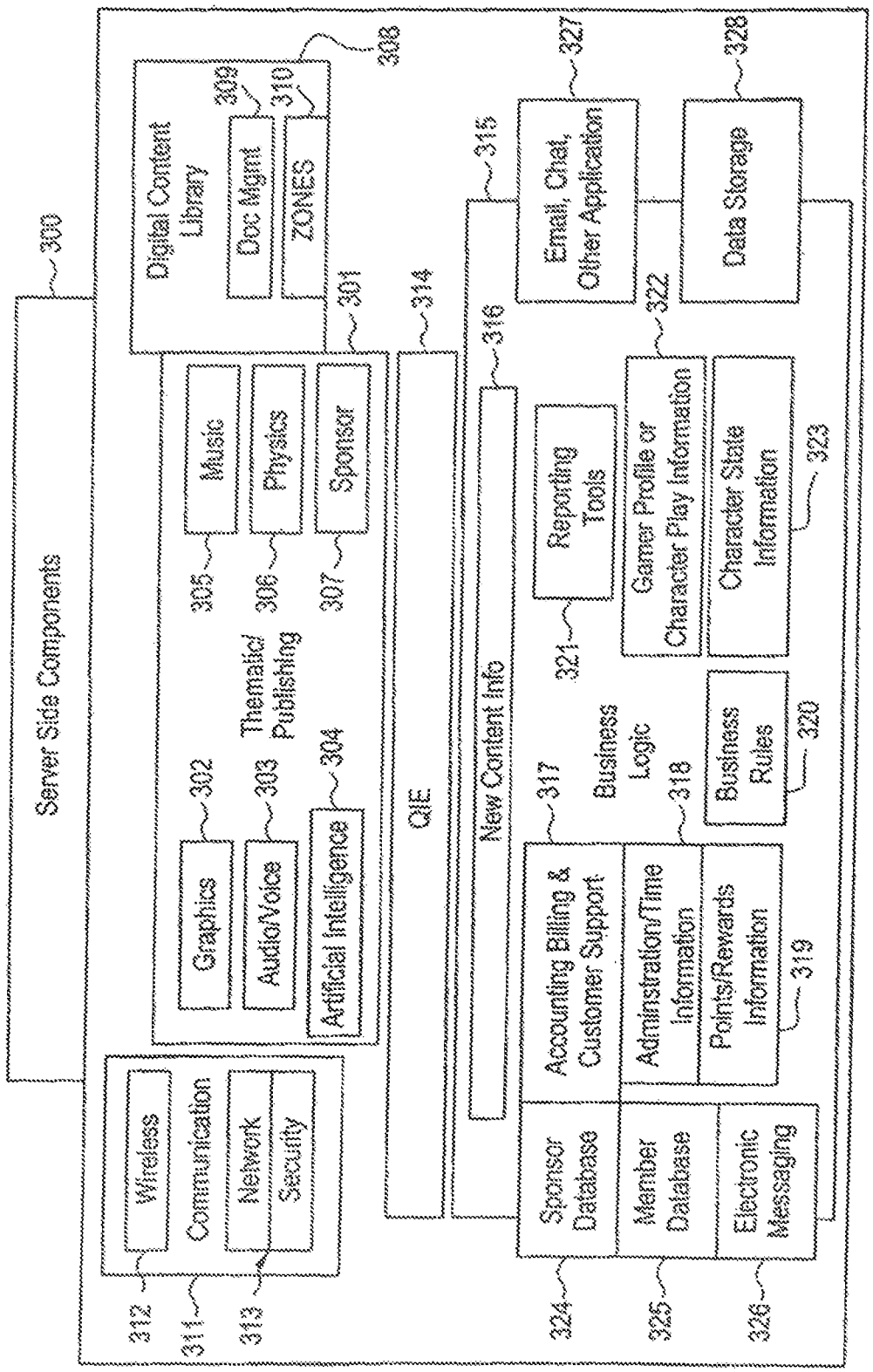
FIG. 4 is a schematic showing one embodiment of the interactive software platform of the present invention, in a server-side arrangement.

In FIG. 4, for example, which shows such a system, a server 300 includes a Thematic/Publishing component 301 having a Graphics module 302, an Audio/Voice module 303, an AI module 304, a Music module 305, a Physics module 306, and a Sponsor module 307. The Thematic/Publishing component 301 interacts with a Digital Content Library 308, which includes a Document Management sub-module 309, and a Zones module 310.

The Thematic/Publishing component 301 also interacts with the Business Logic module 325 via the QIE 314. The Business Logic 325 includes a New Content information module 316, an Accounting, Billing, & Customer Support module 317, an Administration/Time Information module 318, a Points/Rewards Information module 319, a Business Rules module 320, a Reporting Tools module 321, a Gamer Profile or Character Play Information module 322, a Character State Information module 323, a Sponsor Database 324, a Member Database 325, Electronic Messaging 326, an E-mail, Chat & other applications module 327, and a Data Storage 328.

The Graphics module 302 has been discussed previously. The AudioNoice 303, AI 304, Music 305, Physics 306, and Sponsor 307 modules, and the Thematic Application/Publishing component 301 have also been discussed previously, as well as the Digital Content Library 308.

The Document management 309 and Zones 310 modules are a subset of the Digital Content Library 308. The document management application 309 allows for the actual storage of data, information, music, video, audio, film, etc. and divides the information in the appropriate sections by web content, and ZONES (geographic locations ie., country, state, city, street, etc.; genre, market, social, hobby, etc.). The Digital Content library 308 contains all the grandfather, father, son etc., level of maintaining information.

The Business Logic module 325 and QIE 314 modules have been discussed previously.

The New Content Information module 316 is the new content database which contains all new audio, video, rules and scripts for use within the thematic environment. It also maintains versioning information as well as any new security rules/code required for the thematic environment.

The Accounting, Billing, & Customer Support module 317 is a web based interface to all users' and sponsors' information. The Accounting, Billing & Customer support module 317 allows for add/change/delete of information as well as general customer support. The front end goes to the Help Desk and 1st/2nd level engineering support, for example. The Accounting, Billing & Customer Support module 317 may provide general billing information only.

The Administration/Time Information module 318, provides internal support for all thematic environments and administration. The Administration/Time Information module 318 provides for web access to the thematic environment and provides modification as necessary, and may also provide direct access to the state of each user. Other functions may include the modification of business rules and administration access.

The Points/Rewards Information module 319 is programmed to calculate and maintain the number of points that a user has accumulated or lost in the thematic application. The Points/Rewards Information module 319 also maintains the rewards that have been distributed or "awarded" to a user, and information on whether the user has accepted the award, or if the award is still available for another user to claim. The Points/Rewards Information module 319 provides the information to the GUI 302 via the thematic application, to be displayed on the screen, and also updates the sponsor and member databases 324, 325, as well as updates the business intelligence services via the QIE 314. The QIE 314 transmits the information to the Business Logic's 315 Sponsor database 324, Member database 325, and Reporting tools 321, that ties into the Business Intelligence server with the information for tracking the developments of how the points were obtained, the award(s) selected, and the partial profile of the user.

The Business Rules module 320, is a rule-based component of business processes for e-commerce, such as advertising, billing, profiling, etc., and integrates easily with all the networked components, libraries, QIE, and business intelligence. The rules are developed using Java, C, C++ or any other programming language. It includes, XML, HTML or any markup language or other method for communication to connect and communicate with the internet and it will be extensible. The Business Rules module 320 handles the translation of rules to and from heterogeneous commercially important rule systems/languages, as well as to and from the existing components and external services performing actions and testing conditions and maintains the status of the entire QIE environment and keeps its services supported. The Business Rules component 320 consists of intelligent agents for the following: e-commerce, procurement, catalogs, storefronts, auction, configuration, financial—billing and shipping, connecting to the services etc.

The Reporting Tools module 321 is a web interface to both internal and external reporting tools. Internal reports may include online usage, system usage, network usage, system problems, billing information, marketing statistics, and other information as required. External reports may include campaign statistics, impressions, trending, and various data-mining sets. All reports are dynamically created for both internal and external use only limited by the data retained by the reporting database. The reporting database contains information required to generate reports for users/sponsors. The reporting database is schema dependent on user/sponsor needs.

The Gamer Profile or Character Play Information module 322, maintains all the data regarding the character that the user chooses to be or use within his/her application. The choice of characters and their profiles are maintained in the Digital Content Library 308. This information will be catalogued within the gamer profile or character play and can be used with another thematic application, or the user may change the selection of characters depending on the choice that the user makes for the thematic application of choice.

The Character State Information module 323 includes information on the character state of play. The Character State Information module 323 maintains all the information regarding the character moods, facial expressions, positions, modes of movement such as combat, standing, running, jumping, turning etc. The Character State Information module 323 allows the object or character to alter its behavior depending upon either an outside influence such as another user, the computer (using AI), or the actual gamer or user.

The Sponsor Database 324 and the Member Database 325 are a highly secure databases having all sponsor and user information, respectively, including contact information, which contains, for example, billing information, business rules, administration information, and ancillary information. The Sponsor and Member databases 324, 325 contain all the sponsor/user profiles such as age, sex, credit card information, market likes and dislikes, purchases, and tracking information. The Member database 325 is set up during the logging-in process of the thematic application. As the information is updated via any purchases or tracking throughout the thematic application, the information is immediately stored for that particular user. The Sponsor database 324 maintains the information to tie into the sponsor's web site, and on the sponsor's products and product placements.

The Electronic Messaging 326 component includes conventional state-of-the-art applications that is a service that connects to the Business Logic and to the QIE for processing when a user makes the specific request through the GUI.

The E-mail, Chat & other applications module 327 includes conventional state-of-the-art applications in communications, such as e-mail, chat rooms, etc. They are all application services that transfer the information through the Business Logic and to the QIE for processing when a user makes the specific request through the GUI. The applications are based on the thematic application "storyline".

The Data Storage 328 may include, among others, a real-time thematic environment database, an auditing database, and a meta database. The real-time thematic environment database is located in the Digital Content Library 308 (also described above), and is a very efficient real-time database that maintains the state of each thematic environment, user, and the thematic virtual world. The schema is dependent on the networking tool provider. The real-time thematic environment database is tied to an Object Oriented Database that is located on the database server with connections to the Business Logic 315.

The meta Database contains all thematic environment/user/sponsor information that is not dedicated elsewhere. The meta Database includes information having data that is necessary for maintaining billing/high level secure information, and profiling or information pertaining to the thematic environment/user/sponsor.

The auditing database which handles the security system/environment, and is a near real-time database used for auditing the user's movements in the thematic environment, and security. The auditing database may also provide data to various other databases via replication in such a way as to not affect the responsiveness of the thematic schema. The auditing database may or may not be a complete replication of the thematic environment database.

Figure 5:
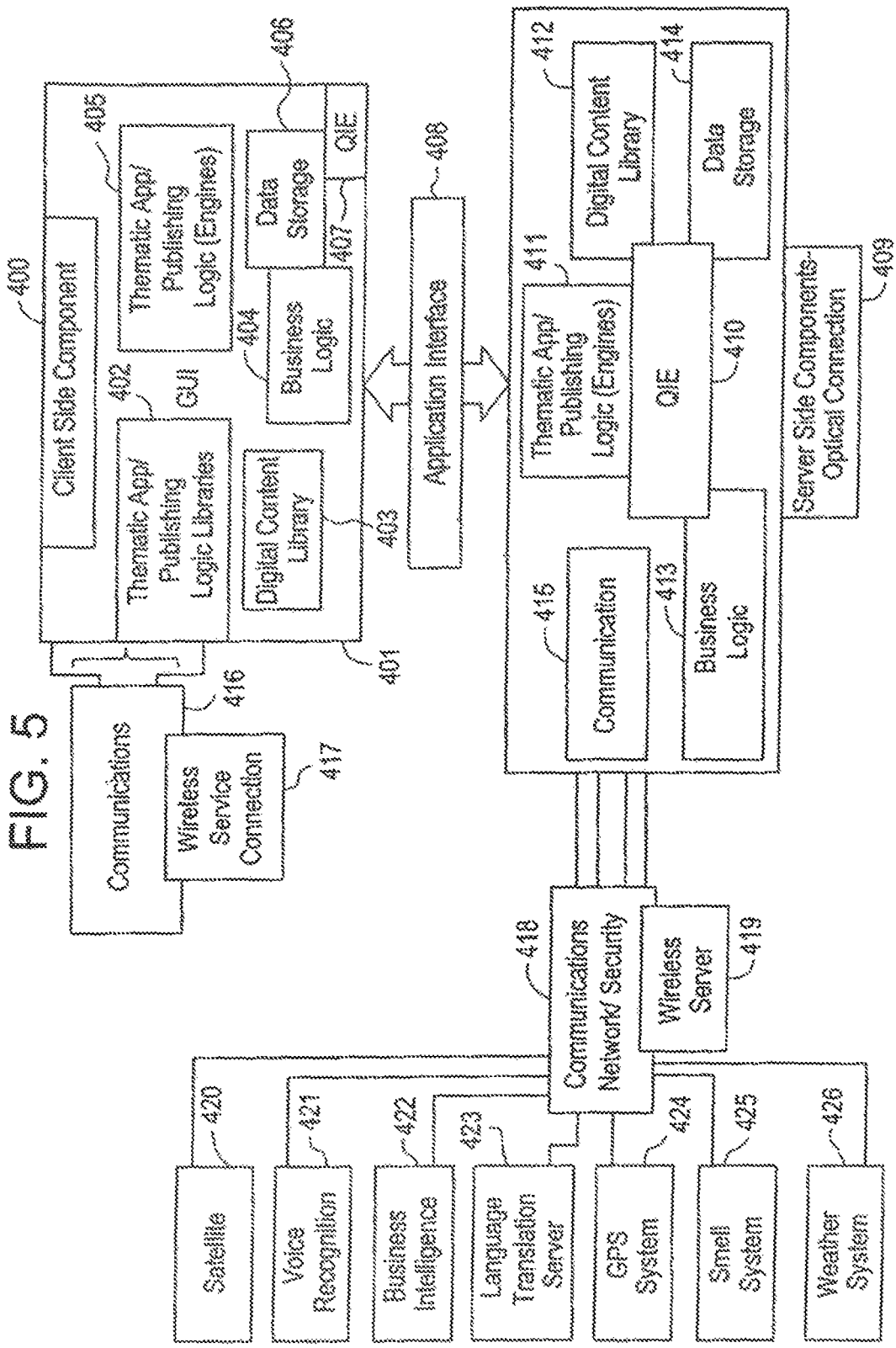
FIG. 5 is a schematic showing one embodiment of the interactive software platform of the present invention, in a client-side arrangement.

In another embodiment consistent with the present invention, FIG. 5 shows a client-server arrangement similar to that of FIG. 2, with the server system 409 having the same components as that of FIG. 2 (i.e., Thematic Application/Publishing Logic (Engines) 411, QIE 410, Digital Content Library 412, Business Logic 413, Data Storage 414, and Communication 415). The client system 400 is connected to the server system 409 via Application Interface 408.

However, the client system 400 includes not only a GUI 401, Thematic Application/Publishing Logic Libraries 402, and QIE 407, but also includes components similar to that of the server (i.e., a Thematic Application/Publishing Logic (Engines) 416, Digital Content Library 403, and Data Storage 406).

In addition, as with the embodiment of FIG. 2, the client system 400 is connected to Communications 416 having a wireless service connection 417, and the server system 409 is connected to a Communications Network/Security 418 having a wireless server 419, which accesses satellite 420, voice recognition 421, business intelligence 422, language translation 423, GPS system 424, and smell system 425 modules. However, one of ordinary skill in the art would know that other modules may be accessed, such as weather system modules 426.

The present client-server system of FIG. 5 is arranged such that the client system 400 can operate independently of the server system 409, but that the server system 409 can be optionally connected. In the former situation, the additional modules 420-425 would instead be connected to the client system 400.

In the latter situation of an exemplary client side system 400 with option to connect to the server 409, the system is set up such that the user does not have the capability to interact with the WWW and does not have the capability to engage in a multiplayer environment. This set up allows the user to play the game that has been written or is on a CD or other storage medium.

For example, the CD is inserted into the CD Drive, and the user can select the loading, onto the system, of all the engine, library, content, communication, driver, and GUI, etc. Information is then transferred to the PC's hard disk. If it is one of the "boxes" of the system, information is transferred to those boxes, hard drives, disks, etc. in the same manner. The thematic application is then launched on that particular device by either pushing a button or by selecting an icon on the screen. The user will be able to experience the thematic application with the limitations of the following: any mini-applications will be simulated, all music, video, film, content will be self contained on the system and pre-selected, and there will be no connection to any live data transferred to the PC or "box" unless connected to the internet.

In another embodiment consistent with the present invention, the client system 400 and server system 409 of FIG. 5 can be disposed in one system, rather being separated into two systems.

Although the above physical architecture has been described above as client-side or server-side components, one of ordinary skill in the art would know that the above components of the physical architecture may be in either client or server, or in a distributed environment.

Further, although the above-described features and processing operations may be realized by dedicated hardware, or may be realized as programs including code instructions executed on data processing units, it is further possible that parts of the above sequence of operations are carried out in hardware, whereas other of the above processing operations are carried out using software.

Further, although aspects of one implementation of the present invention are described as being stored in memory, one of ordinary skill in the art will appreciate that all or part of the methods and systems consistent with the present invention may be stored on or read from other computer-readable media, such as secondary storage devices, like hard disks, floppy disks, CD-ROM, a carrier wave received from a network such as the Internet, or other forms of ROM or RAM either currently known or later developed. Further, although specific components of the system have been described, one skilled in the art will appreciate that the system suitable for use with the methods and systems consistent with the present invention, may contain additional or different components.

Operation

In one embodiment consistent with the present invention, the user accesses the virtual platform which is any type of thematic environment, such as a game, and accessed in any manner, such as by a dedicated website, or via a link on a host website over the Internet (i.e., worldwide web (WWW)). In some applications, the program may request the user to log in and enter a username, password, and to create a profile, which may include personal information, such as gender, age, address, etc., or a virtual profile, if desired. The information is stored by the program in the Business Logic database (208, see FIG. 2, for example) for use later by the Thematic/Publishing Logic 206.

Further, the program may request payment methods to enter certain types of thematic environments. Payment methods may include credit card information, invoice information (for sponsors), or a gift card. The program may then present the user with predetermined options prior to entering the thematic environment (i.e., level of difficulty, or game challenges, in a game environment).

Thus, in one embodiment consistent with the present invention, the user enters the thematic environment, such as a travel website or a geographically themed game, and the Graphics libraries of the Digital Content/thematic content system of the program displays a world map and offers the user the choice of a particular state, country, or city, and the choice of a first person or third person (i.e., avatar) perspective. The geographic thematic environment may be based on modular-based zones with different levels of content. All content in the thematic environments are updated every few months by the program.

Once the user chooses the geographical environment and user perspective, the GUI 200 of FIG. 2, for example, transmits information directly through an API to the Business Logic of the server 205, to display the avatar, for example, through specific APIs 204 to the QIE 211. (Note that although FIG. 2 is used as an example to describe the operation of the present invention, one of ordinary skill in the art would know that any of the other exemplary Figures may be used). The QIE 211 processes the information to determine the type of device and thematic environment, and may re-rasterize the information to format to that device and thematic environment.

Once the avatar and the geographical environment are chosen, the program will provide a prompt on the display screen so that the user may begin the thematic application.

Since all the graphics reside in the Digital Content system, the graphics libraries are ready to accept commands by the user once the user moves, or directs the avatar to move through the application. The Digital Content library 209 maintains all the information in a content management database that is utilized when requested by the GUI 200.

In a specific example of the operation of the present invention, the user may choose a thematic application which includes a geographic environment, and may select the city of entry as Rome, for example. Based on this premise, the program of the thematic application may have the user face fighting lions in a scene in the Coliseum, taking a train to another part of the city, enjoying a soccer match or any other sport, visiting a museum/church or any other type of building, attending a concert, or shop etc. The user will be able to interact with the holograms, other individuals/and or avatars, and other 2D/3D images, including photos, film/video, 2D graphics and 3D graphics. The user will also be able to purchase goods from that city in real time from a store or place of choice. The user will be able to hear the music based on a city's culture, hear the people speaking in their own languages, and in a holographic warehouse environment, for example, smell the foods that are cooking in that part of the world, in order to learn everything about that particular culture, region, and/or history.

The stores that appear as the avatar walks down the street in the thematic environment, for example, are 3D models which are stored in the Digital Content library 209 and displayed by the graphics engine of the program. For example, when the user enters a street in a desired location, such as Rome, the graphics engine of the program will show the street with the actual buildings which exist on that street. If the storefronts on the street are sponsored by a corporate customer, the user may see a well-known restaurant, coffeehouse, bookstore etc. Thus, depending on the level of corporate sponsorship, the user may only be able to view a storefront or a banner, or may be able to fully access the building or a product (such as a car), to have a virtual experience with the physical environment.

Thus, as the user moves the avatar down the street, the graphics library located in the Thematic/Publishing Logic Libraries 203 allows for the avatar's simple movements such as walking, turning etc. In particular, the movement of the avatar/user is generated by the GUI 200 transmitting data through a standard communications system 212 to the server 205. The data is transmitted to the QIE 211 which processes the information and sends the information to the appropriate library for processing. In this case, it is the Thematic/Publishing Logic Libraries 203 and within this layer, the Graphics application library, which is connected to the QIE 202 via the APIs 204, for example, for requests for information and processing.

Thus, as the user moves throughout the thematic environment, depending on the user's access of the music, video, animation, services, etc., each of the API's are seamlessly connected to the Libraries ready to either re-calculate or utilize whatever is stored in the Digital Content system or service libraries. The commands or programming are tightly coupled with each layer and with each service. If the user selects or touches a poster, for example, the program will connect the user seamlessly to the internet site that is tied to that component for either purchase, review, or any other instruction/operation. Upon completing any task at the sponsored site, the user is then exposed to a point of returning to the thematic application to continue where they had left the program or application. The entire thematic application is an integration between the internet (WWW), Business Logic, Thematic/Publishing Logic, and QIE, and the GUI. The QIE will determine the actual output as it sends information out to the device to determine its type and to re-calculate the objects from a viewing perspective to be manipulated to that specific device.

The user may move the avatar into a 3D model of a store, for example, the building which is stored in the Digital Content library. The Digital Content library maintains all the information in a content management database that is utilized when requested by the GUI. All the information in the content management database includes data, codes, binary files, web content, event notification, and other information. It may also contain scheduling directions for when the web site access and identification of where to place the web content or advertising, e-commerce, video, music, etc. are to be placed.

In one example, if the avatar enters the store and speaks to a store employee within the thematic environment, the GUI transmits the appropriate information entered by the user via a speech processing means, keyboard, or other input means, and an API, to the AI library and to the voice libraries of the thematic content for both movement, high level action, and the processing of the voice data. The GUI will transmit the information to the Thematic/Publishing Logic via an API to contact the Sponsor library. The information request is transferred through the GUI to the Thematic Application library via an API to again contact the Sponsor library for a simulated web connection to the sponsor site. The information is then submitted back to the GUI for display showing the Sponsors web site. The Sponsor library will then send a call directly to the Digital Content library for the information requested. The voice library will then transmit this information in a recognized data form to the standard communication device for output to the screen, or to speakers or other device, and any movement of the avatar and NPC store employee will be displayed on the screen via an API to the GUI for display.

Once in the store, if the user moves the avatar to touch a product in the store (i.e., by hot click), the movement is regulated by the graphics library located in the Thematic/Application Publishing Logic Libraries 203, and the Communication component 212 will connect to an API 204 that activates the sponsor library located in the Thematic/Publishing Logic 206, and the GUI 200 of the program will automatically take the user temporarily out of the current environment to a dedicated sponsor website. The sponsored website may be connected to the thematic environment via standard internet channels. Alternatively, the sponsored website may appear within the thematic environment as a display on the screen.

In one example, once at the sponsored website, the program may request that the user purchase products utilizing conventional "shopping cart" systems and standard transaction interfaces with respect to billing, shipping, etc. The program may ask that the user pick the products for purchase, enter the quantity, complete the transaction and then enter the method of payment, using the standard "shopping cart" model and standard transaction interfaces.

Any information on purchases by the user, whether "virtual" (if part of a thematic environment task), or real-world, will be sent by the program via the QIE and APIs for processing in the accounting and billing components of the Business Logic 208. The information will be processed in the accounting, billing, user, and sponsor components of the Business Logic. The information to ship the product, and billing information, will be transferred directly to the sponsor from the Business Logic via an API that transmits the information through the Communications component and then directly to the sponsor, if this is the information that has been stored for that particular sponsor; and distributed to the billing and administration component of the Business Logic that is handled by the existing server and not by the sponsor's server environment.

Once the user makes a purchase, the program may display a prompt to return the user to the thematic environment at the point at which it was left. The user enters the information via the GUI that gets stored in the Business Logic. Thus, the user may click on the return prompt that forwards an instruction to the Graphics library to return to the previous state.

All security for purchase, rewards, points, and profile is maintained in the Communications component. As purchases are made, points are accumulated or rewards are awarded (i.e., coupons, etc.). The security system program is constantly maintaining the state of the user checking for any hackers, corruption of data, sabotage, or modification of data.

In addition, the program may be tracking the avatar's movement throughout the thematic environment in order to trigger a simulated award mechanism as the avatar moves in a predetermined direction. The award mechanism may be points to be awarded to the user based upon a predetermined calculation scheme. In order to obtain the points, the system will send a request to the Thematic Application logic via an API and to the AI Engine to determine an outcome. The AI Engine then transfers the information to the Business Logic engine via an API for calculation of the points and will submit that information back through the APIs to the GUI for display.

In one embodiment consistent with the present invention, the user may be within the thematic environment, and the program may ask the user to "grab" an item from a sponsor's website (or from a competitor in game play) for use within the thematic environment. The program will instruct the user to connect to the worldwide web (WWW) through another object or through specific sequences that are provided by the thematic application viewed on the screen, or in voice format. The program then will seamlessly connect the user to the WWW via a call that is directed from the thematic application or from a selected object within the thematic environment, to the sponsor's website. As stated above, the program may also provide the option of showing the sponsor's website on the display screen within the thematic environment.

In another embodiment consistent with the present invention, the program may provide information and instructions for the user to read while in the thematic environment by means of the AI library located in the Thematic/Publishing Logic 206 layer. The information from the AI library is sent to the Digital Content library 209, which interfaces with the QIE 211 for interpretation and display via an API 204. Then, the API 204 sends or transmits the information to the GUI 200 which displays the information on the display via a standard communications and drivers protocol. The information displayed by the program may be read by the user for later use in the thematic application for answering questions to achieve points, for example.

The points may be calculated by the program through the Business Logic 208 and the Thematic/Publishing Logic 206 application. If points are obtained by the user, the points are calculated and held in the Business Logic 208 layer, and the data is shared with the user profile retained by the user/sponsor specific database. The points information is also transmitted via an API 204 through the QIE 202 to the display such that the user can view the points. The display of the points may be shown on a PDA, or other small electronics device that is conventional or specifically designed for this purpose.

In one example of this embodiment, the user reads the information and is provided with an object for the user to "grab" using a "hot click" or other selection means at the sponsor's website or elsewhere, and then return the user to the thematic environment for use of the object. The object may have certain characteristics that will be retained by the program, including all the meta data and any other data associated with this object in the "grabbing" of the object. The Thematic/Publishing Logic 206 of the program is associated with the "grabbing" of the object, and the Digital Content library 209 stores the information on the object. To view the component and to use it, the graphics component of the Thematic/Publishing Logic 206 will interface with the Digital Content library 209 to retrieve the object via an API 204 and pass it to the QIE 202 via an API 204 to be rasterized or transferred to the GUI 200 via another API.

In another example of this embodiment, the program may provide information to the user in the thematic environment to generate points by touching, rather than "grabbing" an object, by walking down the street, purchasing an item, using a mini-application, or any other action. The points may be "cashed in" by the user for real life rewards. The rewards are stored in the user/sponsor specific database. The program, using the GUI 200 via the APIs 204 connected to the QIE 211, can display or list the rewards for the user to view at the end of the game. The actual "cashing in" process may be handled through the accounting function of the Business Logic 208.

As the avatar continues to move around the streets and stores of the thematic environment or at websites on the WWW, the GUI 200 transmits the data on the avatar's or user's movements to the Business Logic 208 via the WWW, which sends data/information through the API 204 to the Business Intelligence tracking service 218 and tracks the information in a database in the Business Intelligence layer 218.

For example, the user may pass by a record store and hear music and watch a video coming from the store. This audio and video is activated by the movement of the avatar and the action of passing the store. As the avatar is passing the store, an instruction is sent by the GUI to the Thematic application library to obtain the appropriate music piece for that scene. The Thematic application library transmits the request to the Digital Content or Sponsor components for the appropriate music piece and video component. The music is then transmitted via an API to the GUI to transmit the sound via the speakers and the video component information is transmitted to the screen display via the GUI. The user may either save the data to disk to return to that point, connect to the internet via standard communication channels, or log off. If the user decides to save the data, the information will be maintained in the data storage layer by the program. If the user decides to connect to the internet the information that has been tracked for that particular geographical area, for example, will be transferred and the profile information updated for that particular user by the program. This information will be transferred by the program via standard communications to the internet server and the program will update the Business logic.

In one embodiment of the present invention, the user may be in a thematic environment on the internet that is based on the QIE technology platform. Since the QIE platform is device and resolution independent, it gives the thematic applications the ability to reformat or re-rasterize its output to any device. The device may be a cell phone, projector, large screen, small display, etc. This also allows the user to continue the thematic application at the point of last interaction. The user can continue the application from any location where there is access to the internet or to a QIE platform that ties into the thematic application.

In another embodiment consistent with the present invention, real-time information can be integrated into the thematic environment. For example, the avatar/user in the thematic environment may view a screen that has a real-time televised event on display, or may use a mini-application, such as e-mail, which occurs in real time. Video transmissions, and e-mail applications, etc., may be sponsored by a corporate sponsor, or may be provided by the thematic application.

The program obtains real time information through the WWW from the satellite server service 216. For example, the server 205 will poll the satellite service 216 for any new or updated information to any of the video, live sports, live concerts, or film that is being requested by the QIE 211. The program is such that the QIE 211 will be continuously connected to and requesting updates from the satellite service 216 via an API which connects the QIE 211 to the satellite system service 216.

The request for real-time information, which will be recognized when the user sees or "hot clicks" on a television screen, or invokes a mini-application, such as e-mail, will be accomplished by the GUI 200 that transmits the information to the graphics library of the Thematic/Publishing Logic 206 via an API 204. The QIE 211 will in turn request information from the digital Thematic/Publishing Logic 206 database via an API to retrieve the existing video or short film etc. If the QIE 211 requires data that is larger than a specific size, or the time has expired for running real-time information, the program (via the QIE 211) will send a request to the satellite system 216 for the new or updated information. The new or updated information may be inputted as a pure satellite transmission tied directly to the particular screen or display that needs the information.

If the transmission is live data, the program will have the satellite transmission expire upon the completion of being televised on the display in the thematic environment. A message from the satellite system 218 will transmit the information back to the QIE 211 that the transmission is complete and the QIE 211 will submit a command or message to go to the Digital Content Library or sponsor library for stored data, information, video, or film that may be shown on the display in the thematic environment. Once the command has been accepted by the Digital Content Library to update the display, the Digital Content Library will transfer the content to the graphics engine via an API for processing and then will pass the content to the QIE for processing, formatting, or rasterization. Upon completion, the program will show a video or film clip in place of the live satellite transmission. This can take the form of music, sports, film, etc.

In a first example of the above real-time application, the user may be within a thematic environment, and may direct an avatar to a pub in a large city. The program would present an image of the pub on the screen using the GUI 200 via the Thematic/Publishing Logic 206. The user may then direct the avatar to enter the pub. The display will show the user a pub environment with a large digital screen in the pub, where a video of a musician or a band is playing, or a game is being broadcast, or a film is being shown, or some other type of video, whether live, stored video data, or simulated.

If the pub screen is "sponsored" by a corporate sponsor, for example, depending on the "sponsorship" or the contractual agreement, when the avatar is inside the pub or within vicinity of the screen, a call for that specific sponsor's updated information will be made from the GUI 200 via an API to obtain the information from graphics library of the Thematic/Publishing Logic 206. As stated above, the program will then "pull down" or obtain the particular information that should be viewed on the screen—i.e., music video, direct satellite transmission of a sports event, film clip, movie, etc.

If new or updated information is requested by the QIE 202, this information may be received by the program as a pure satellite transmission tied directly to that particular screen in the pub, that needs the information. In this case, where the information is live data, the transmission will expire upon the completion of being televised. After live transmission has ended, the program will retrieve stored data, information, video, or film etc., from the Digital Content Library or sponsor library, and show this information on the screen. The video transmission will be displayed only as long as the user is in the vicinity of the screen, otherwise, this application will not be sent to the display for viewing.

In a second example, the user may enter the thematic environment and choose a geographical "zone" such as a particular country and city. Upon the user's choice, the program will connect to the WWW via standard internet connections or communications. The user may then enter a "headquarters" environment that displays content for that particular city. The content could be shown by the program in the form of 2D—i.e., photographs, 3D images or a combination thereof. The program will also show a very large digital screen in the center of the user's display. In this case, the screen is not "sponsored", and thus, is available and "programmed" to accept any type of live video, film, real life sports events, or any other type of satellite transmission, etc. However, the screen may have channels associated with it that are sponsored; therefore, the transmission, video, film, satellite, sports, music etc. may be programmed to that specific sponsor. In addition, product placement can be integrated into the real-time transmissions (i.e., advertisements etc.).

As with the first example, the program is such that the GUI 200 is connected using standard network connections to the internet via the QIE 202. The user may input a request via the GUI 200 for a particular type of transmitted data to be shown in the screen, and the graphics engine of the GUI 200 will request from the QIE 202 a location for the data. The QIE 202 will in turn request information from the Thematic Publishing Logic, and/or Digital content library library or may also request information in the Data Storage area located in the Business Logic via an API, requesting input to retrieve the existing video or short film etc. If the QIE 211 does not find existing data, live data, or the data files are larger than a specific size, or the time has expired for running real-time information, the program (via the QIE 211) will send a request to the satellite system 218 for the new or updated information for display back to the QIE 202, then to the GUI 200, which places it on the display.

In one embodiment consistent with the present invention, there may be a button or channel button on the bottom of the screen in the thematic application, which allows the user to change the "channel" to a different selection—i.e., a sporting event, movie, film, or concert—or back to the thematic application menu screen. This button will be limited to the number of selections based on sponsorship, for example, and based on the thematic application. Upon the user selecting the button or "clicking" on the button by any selection means, the program will display on the screen, one or a number of channels, for the user's selection. The user may then choose a particular channel and the program will transmit this information through the GUI 200 via standard internet connections, for the QIE 211 to begin the search process once again for the requested data either through satellite transmission or through the Business Logic 103 that ties directly to the Data Storage 106.

In another embodiment consistent with the present invention, a real-time application would be presenting a clock or other timer within the thematic application. Thus, the program would provide the user with a section in the thematic application that shows time. The clock information is tied to the user's system and operating system. If the user selects a particular country and city within the thematic application, the clock will display the information that is specific to that time zone via standard communications with the internal operating system. If the user selects a different country, the clock will display both the existing timezone from the internal clock and will forward information to the GUI 200, and will also, through standard internet connections, request information regarding the country specific timezone that is selected. The request is made to the server 205 and from the QIE 211 to obtain the clock information. The QIE 211 will then put in a request to the Business Logic 208 for the updated information and pass it back to the QIE 211 for interpretation or rasterization to a particular display or device and to the programmed or displayed 2D/3D object, image or "clock".

In another example of real-time applications, the program may also provide captions on the television screen within the thematic environment, that would translate the language of the program, for example, from Italian, into English. The information on the screen is transmitted via the WWW through a communication portal that sends the information directly to the satellite service 218 and the translation service component 219 that services the Digital Content library 209. To further this example, the information that is transmitted via the WWW routes to the Translation service component 219, services both the Digital Content library 209 and the Business Logic 208. Thus, information in one language is simultaneously translated into another language and displayed to the user.

In another embodiment consistent with the present invention, the user may be able to select audio channels (i.e., radio, talk radio, music channels etc.) to listen to while accessing and using the thematic application. The program would display a 2D or 3D interactive radio on the screen which the user can activate using any selection means, including "clicking" on the radio. A list, menu, or a knob, for example, may be displayed to the user via the GUI 200, so that the user may change channels on the "radio". As with the video setup, the GUI 200 connects to the internet via standard internet connections, and the QIE 211 determines the location of the requested data. The QIE 211 passes on the information to the Graphics engine via an API requesting input to retrieve existing audio files etc. The Graphics engine sends the request to the QIE 211 to obtain the information located either in the Business Logic 208 for real world data, via an API, requesting input to retrieve the audio.

If the QIE 211 does not find existing data, live data, or the data files are larger than a specific size, or the time has expired for running real-time information, the program (via the QIE 211) will send a request to the satellite system 218 for the new or updated information for display, back to the QIE 211, then to the GUI 200 and the speakers or other audio device to project the voice, music, etc. for the user to hear.

In another embodiment consistent with the present invention, a GPS system 220 is integrated with the thematic application. In this embodiment, the GPS system 220 may be integrated in stored form in a database which is updated by the satellite service 216, or the GPS system 220 may be connected to the thematic application via standard internet connections, from which information is downloaded.

In this embodiment, the program is such that the GUI 200 is connected using standard network connections to the internet via the QIE 211. The user may input a request for location information via the GUI 200, and the graphics engine of the GUI 200 will request a location for the data from the QIE 211. The QIE 211 will in turn request information from the graphics library via an API requesting input to retrieve the existing location information etc. If the QIE 211 does not find existing data, live data, or the data files are larger than a specific size, or the time has expired for obtaining real-time information, the program (via the QIE 211) will send a request to the satellite system 218 for the new or updated information for display back to the QIE 211, then to the GUI 200, which places the GPS information on the display.

The location information provided by the GPS component 220 may be incorporated into the thematic application itself, or provided within a programmed GPS-type display device that simulates a GPS system in the thematic application. The GPS images are stored in the Thematic Application/Publishing Logic Libraries 203 in the sponsorship component and the Thematic/Publishing Logic 206 interacts in conjunction with the Digital Content Library 209 for obtaining the location information.

The program allows the GPS system 220 to either view the content in map mode, or actual 3D/Visual mode depending upon the preference of the user. The program may provide the user with a display button as a selection means, for example, to select either the map information or the visual information. Upon selecting the visual mode, for example, the GUI 200 connects to the internet via standard internet connections, and interfaces with the QIE 211 for the determination of where to obtain the location data. The QIE 211 passes on the information request to the Graphics engine via an API, and the Graphic engine sends the request to the QIE 211 to obtain the information located in the Digital Content Library 209 for that particular area, building, etc. In the visual mode, the user also has the option of obtaining live information regarding each building in the thematic application or elsewhere, including, for example, a sponsored site. The GPS information may include at least a description of the building, telephone number, and street address.

In another embodiment consistent with the present invention, the user may use a mini-application within the thematic environment, for calculating, e-mailing, purchasing, educational, and other purposes. The applications may be either simulated or live, such as e-mail. The simulated applications are written in any of the following languages or programs: C, C++, Java, PostScript, or other language which would allow the development and viewing of a simulated but interactive application that is viewed on a display.

In one example of the use of a mini-application, the user may decide to use either a thematic application that is viewed on the user's display as part of game play, for example, or a current working application. The user may also "click" on a portion of the screen that will call up or bring into view, the selected simulated application, making it accessible to the user. At this point, the AI library is activated and the program will type the request or instructions with respect to the mini-application, on the display to the user. The user then selects the mini-application that is being highlighted, pointed to, etc. The mini-application information is then transmitted to the server through the GUI 200 and through normal communication channels (over the internet, for example), activating the QIE 211 to forward or communicate the information to the AI library for processing. The AI library processes the information and makes a request to the Thematic/Publishing library and sponsor component to send the correct graphical display and interactive mini-application in a format that the thematic application can recognize for use therein. The program rasterizes and/or processes if necessary, the mini-application for use on the desired particular display or device. This is performed by the passing of information, data, or the mini-application from the APIs that connect the QIE 202 to the GUI 200. Any information that is created in the mini-application can be stored in an area that holds information for a temporary period of time in memory, or may be closed out and not saved.

In a second example of using a mini-application within a thematic application, the program may provide an instruction on the user's display, which may request that the user utilize a certain mini-application—for example, to continue to the next level in a gaming format. The instructions are automatically programmed to appear on the user's display based on the movement of the user/avatar within the thematic application (i.e., the user/avatar arriving at a particular section of the street in a geographically-themed application). In another embodiment, instead of instructions that are displayed on the user's display, other information relaying means, such as voice commands, can be used. Thus, the written instructions and/or the voice commands may be activated in the thematic application when the user/avatar arrives at an area, or interacts with a certain device, which are programmed for the use of a particular mini-application.

As soon as the user/avatar approaches within the proximity of this "programmed" location within the thematic environment, the AI library is activated via the information/data sent over normal communication channels to the server through the internet. The AI library requests both the voice library and the Digital Content Logic database to pull or obtain specific information that is viewed on the display by the user. The information is transmitted via an API to the QIE 211 for either rasterization or passing to the GUI 200 for viewing and voice.

The QIE 211 activates and passes on the information from the AI library to the appropriate component where the mini-application is located—such as the sponsor component library located in the object server of the Thematic/Publishing Logic layer 206. The Thematic/Publishing Logic sponsor component then displays the mini-application via the QIE 211 and the GUI 200, such that the mini-application will be available for viewing etc. on the display, and available for use by the user.

Examples of mini-applications within a thematic environment include the actual use of email, chat, etc., that can be naturally integrated with the thematic application. At any time, the user may select a mini-application or part thereof, which can be interfaced with other users over standard network or internet connections. The selection of such a mini-application may require interaction with the Business Logic 208, and the program will allow the mini-application to be accessed within the thematic application by using standard communications and APIs.

Figure 6:
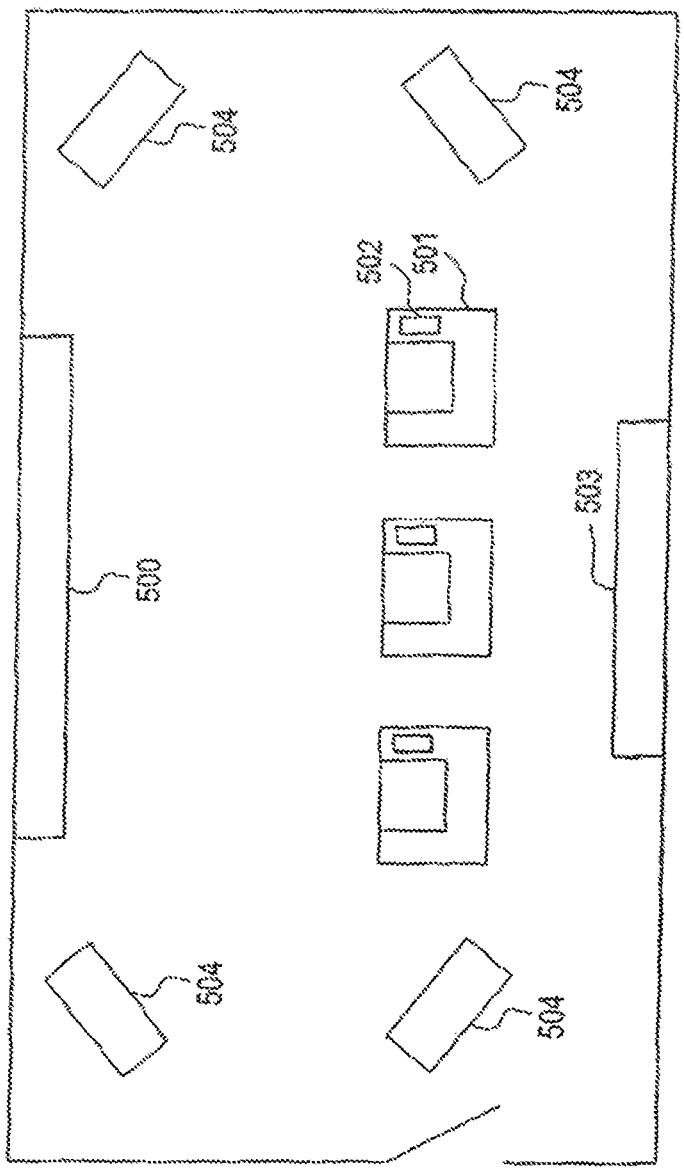
FIG. 6 is a schematic showing a cinematic room according to one embodiment of the interactive software platform consistent with the present invention.

In another embodiment consistent with the present invention, the thematic application can be presented in a holographic environment. In one example of a thematic application in a holographic environment, a "cinematic room" (see FIG. 6) can be provided, housing large non-intelligent display screens or digital displays 500, plasma screens, LCD or intelligent screens/displays or the like, and chairs 501 or other seated- or standing-accessible structures with embedded controllers 502. The chair, for example, provides the user with a comfortable environment that contains an area or enclosure for the head for connecting a headset with a voice recognition system 219 (i.e., microphone or speaker system leading to the computer system 503), that allow for no interference. The voice recognition systems may be open and allow the users to converse with each other. The computer system or film recorder projects images onto the display screen 500 and the images can be manipulated via the embedded controls 502 in the chair 501 or through the voice recognition systems located therein. The user may also experience the images in a 3D environment via the use of 3D goggles or other 3D devices. However, a chair is not necessary, and other devices, such as handsets and headsets, could contain the appropriate systems. Depending on the screen or display type, the configuration of the equipment may change to be appropriate to that structure.

In one embodiment consistent with the present invention, a screen display with no intelligence is used, and the thematic application is projected from a projection system connected to a computer system (i.e., in a client and/or server environment). In another embodiment, the display is a smart digital display, and the thematic application is projected directly from the smart digital display. In both embodiments, the controls for interacting with the screen or display are embedded controllers (i.e., embedded in a chair arm), and may include a mouse, joystick, ball, pen, or any other user-controlled device that allows the user to manipulate data or images on a very large screen. The embedded controller contains the driver information or embedded QIE 211 software. The QIE 211 software will transmit the information via wireless technology or cable. The system will be connected to a film recorder or computer either via wireless technology or through cable.

In the chair arm example, for instance, the user embedded controls 502 are built directly into the chair arm having a mouse, joystick etc., and the embedded controls are connected to an interface and standard communication device or connection that will connect back to the server 205 and the GUI 200 of the thematic application platform. The smart screen may have an internet connection component that is embedded therein, that allows it to act as simply a "dumb terminal", with the standard internet connections allowing the holographic thematic application system to maintain all data and processing on the server itself, or the system may have a controller that incorporates the QIE 211 and other programs that will allow for the connection via a standard communications device, to the internet, and which allows the system to interpret information both at the display screen 500 and at the server 205 via the GUI 200.

In another option, fold up screens are provided on the chairs, the screens which are connected via a wireless or standard connection to the controller in the chair, and to the main computer system 503. The user may flip up a screen to access an application such as e-mail, or to track other thematic applications that are not on the screen, or perhaps to zoom in for a closer look at another thematic application that is currently on a larger screen within the cinematic room.

In one example of the use of a cinematic room, the room may be designed to contain as many as 50 or more users that will work together as a team on the thematic application (i.e., game), or compete with other users who may be located anywhere remotely around the world. Each of the embedded controllers 502 may also contain a chip that contains the QIE 211, allowing the chip to communicate directly to the server 205 forwarding commands to the GUI 200.

In one example, a large team of users may be working together or in competition, and the connection from the chairs to the computer system or server of the holographic thematic application may be via cable, standard communication networks, or through a wireless network. The computer system may contain the entire thematic application platform and storage information for the profiles that are being created for the large teams of users that connect to the thematic application server (which is perhaps located in a separate building). As the information is updated and tracked by the program, the program may perform profile information updates on a local sever. and then after a set period of time, the program may update the main server 205 via the GUI 200, transferring updates to the QIE 211 and then to the Business Logic 208.

Further, in the above example of a large team of users, the computer system of the cinematic room of the present invention may also be set up to communicate directly through a standard internet connection to the host server, where all the information on the profiles is stored on the server itself and tracked via the Business Logic 208 and user database. In this example, the users log into the system and select the country of game or other play. The GUI 200 then transmits a request for information through a standard internet connection to the server, to the QIE 211 and to an API connecting to the Digital Content library 209, for obtaining the requested information. Once obtained, the information is sent through an API to the QIE 211 for interpretation and display, with the information being sent or transmitted via an API to the GUI 200 which displays, via a standard communications and drivers protocol, on the display device.

In the example of the operation of the team of users, the user selects the thematic application desired, and the program may request information on the number of active players in the thematic application at that particular location. As stated above, this information is displayed on the display screen via the GUI 200, which interacts with the QIE 211 and Business Logic 208 via APIs. Each of the locations around the world where the users are located, will allow for the same configuration.

The program may allow for up to at least ten (10) main users on a team, with the others being included in a support function in directing the 10 main users in obtaining their mission in the game, for example. Each group of main users will be able to select an avatar that is displayed on the screen. In order to select an avatar, the users are shown samples and profiles of different avatars.

Each user may be able to communicate via headsets, for example, or may be able to email/chat directly to their team mates. The email and chat applications are servicing the platform via the WWW which is connected to the Thematic/Publishing application server and Business Logic 208. The users will be able to see other players that interact with their thematic environment, on the display, via the connection of the QIE 211 and a multiplayer communications application that is licensed from an open source or standard application vendor. Each of the groups of users will be able to interact through the QIE 211 that will direct the flow of information to the multiplayer network software and back to the QIE 211 for instruction that will be delivered to the Thematic/Publishing Logic 206, Business Logic 208, GUI 200, Digital Content Library 209, and any of the services such as translation, satellite, voice, business intelligence, GPS, smell etc.

In another embodiment consistent with the present invention, the holographic thematic application platform may be provided in a warehouse environment. The holographic and/or thematic application warehouse 600 would be rented by users on a time basis, for example. The warehouse rooms 601 may be set up in a maze design, and the number of rooms are dependent on the size of the warehouse. There may be a minimum requirement of, for example, three rooms, based on the particular thematic application.

In each room 601 of the warehouse, there will be several projection systems 602 for the visualization and maneuvering of holograms. Each room 601 may contain sensors connected to embedded controllers 603 located in the walls and floors, for example, that sense touch and movement. The controllers are programmed to connect to the main computer system 604 that may be located on the premises or offsite. The sensors are designed to transmit information to the main system following the user's response (i.e., voice activated response), touch, or movement through the rooms. As the user touches the walls or moves through the rooms, the program makes the walls and floors change with the thematic application. In effect, the user becomes the avatar and can participate in a unique and real-world way, in the thematic application.

In an alternative embodiment, personal computers (PCs, PDA's or some equivalent device) are provided in the warehouse so that the users may connect to the internet or other applications while they walk through the digital or thematic warehouse. The PCs can be connected via wireless or direct connection, cable or standard connections.

Depending on the geographic location or the thematic storyline, the program may incorporate "synthetic smells" with each room or change. A "smellerizer" 605 or other synthetic smell system can be connected to the computer system 604 and the odor emitters connected to the smellerizer 605 may be placed in the walls of the rooms 601 of the warehouse. For example, the user may be walking through the warehouse room 601 in a thematic application, viewing holographic projections of a bakery, for example, and the program will issue a smell of baked goods through the odor emitters of the smellerizer such that the user has a "real life" experience.

In other examples, an artificial weather system 606, such as those commonly used in movie-making, which can produce a fog, rain, or other weather event, may be connected to the main computer system 604 using standard communications, with the weather system outlets being provided in the warehouse rooms 601. Therefore, if the user is in a thematic application, such as London in a pea soup fog, for example, the fog will be released from the artificial weather system outlets within the warehouse rooms, so that the user has a "real life" experience. The computer system 604 can be programmed to change weather patterns based on changes in the thematic application.

In addition to the artificial weather system 606 disposed in the walls, ceilings, or floors of the warehouse, speakers 607 are placed therein to issue sounds (i.e., music, weather, background etc.) to simulate reality. The sound system 607 may operate in conjunction with the artificial weather system 606, etc.

For the warehouse application example, a separate computer system 604 is needed for the programming and maintenance of the sensors, weather system 606, synthetic smell system 605, holograms, and other technologies needed to maintain the thematic application system. The user will completely interact with a 2D/3D world, and experience a "real life" immersion of the thematic application. The walls and floor and all of its components would act as the GUI. The warehouse holographic thematic application system may also contain the QIE environment for local storage, processing, and communication and also use mirror imaging technology to assist in the display of the 2D/3D images/video/text/graphics/etc. The system may be any size from a Grid type system up to a supercomputer for calculating all the processes. Artificial intelligence algorithms and applications may also be used for the processing and intelligence.

In operation of the warehouse example of the present invention, the user would approach the warehouse, and log into the computer system 604, the program login would connect to the main computer system via the WWW, and to the server, for example, through standard communication technology and applications. The connection is accomplished by the GUI transmitting information to the QIE via the standard internet communication channels, to update the Business Logic regarding the login. The user logging in could be either a registered individual or a newly registered individual. The main computer system 604 maintains the person's profile information, and the program will ask the user to select his/her persona (or profile). A selection of avatars and their profiles will be generated on the display, screen or wall by the program for the user to select from. This is generated by the GUI connecting to the QIE for data. The QIE makes a request to the Thematic Application/Publishing Logic for the appropriate information that is transferred back via the QIE to re-rasterize or process for its appearance on the display. This information could be a set of buildings, a street, a store, museum, historic site, etc. It also will display all sponsor based advertising, videos, movies, or any other information provided by the sponsor component. The program passes the information back to the GUI and is displayed with the correct attributes for that wall, screen, display.

Once the object or avatar has been selected by the user, the program stores this information in the main computer system 604 to update the internet thematic application play at the main computer system 604. The main computer system 604 is tied to all systems internationally via the multi-player communication application/server/etc.

Depending on the system set up (i.e., screens, weather system etc.), the GUI will be transmitting information to the server and the QIE, by connecting through specific APIs. The QIE processes the information to determine the type of device and may re-rasterize the information to format to the particular device and screen size.

In a geographic thematic application, the program may provide the user with a selection of countries before entry into the rooms 601 of the warehouse 600. Each room 601 of the warehouse 600 is programmed to continue the exploration of the thematic applications that are located on the main thematic application system server, for example, that is accessible via the internet.

Upon the completion of the login, the program may ask the user to proceed either by voice command generated by the computer system. or via a display on the display screen. The voice is transmitted through speakers that are connected to the computer system.

If voice is chosen, then the user can use voice commands to guide the object/avatar through the thematic environment (warehouse or on computer system), such as streets, stores, etc., and to communicate with other avatars or NPCs in the thematic environment. The voice process is initiated via a microphone or some type of device that will accept voice data and transmit the voice through the GUI and through normal communications channels via the internet to the voice recognition service. The information is processed and passed through the QIE for direction to the Thematic Publishing Logic to activate one of the libraries based on the command given. For example, if the command involves a physical action, such as making the avatar jump, the physics library, which handles physical rules, is activated. If the instructions are to "take a left", the graphics library is activated. The information is then passed back to the QIE via APIs and is passed to the GUI for display on the screen.

The user may then proceed to follow the program's directions for entry into the warehouse by walking on a "boardwalk" or following a path to a doorway, for example. The user may open the door and a hologram of a person may appear, greeting the user, for example. The hologram is generated by a projector that is connected to the main computer system 604 in the warehouse. The hologram is programmed to appear based on the movement/touch/voice/data entry of the user.

Thus, in the warehouse application, the user may enter the warehouse in order to have a "real life" experience, such as becoming a part of a geographical scene, by acting as an object or avatar in a thematic digital application. As the user walks through the warehouse, the sensors disposed in the floors, etc., follow the user's footsteps. The sensors are controllers containing the necessary chipsets and software to monitor movement, and they track the user's steps, sending the information to the QIE for processing. The sensors are connected to the main computer system 604 via standard communication cables and/or devices and communication software and will transfer the information to the main computer system 604 by submitting the information through an API connected to the QIE.

The QIE will take the information that is being tracked and transferred and determine if it needs to go to the Thematic/Publishing Logic, the Business Logic, the Digital Content, or all of the above. In this case, the QIE will transfer the information to both the Thematic/Publishing Logic and the Business Logic for processing. The Thematic/Publishing Logic will determine which library will be used for processing—Graphics, AI, Physics, Music, Video, Voice, etc.—or if there will be calls upon the Digital Content Library for the information stored in its database. In this example, the Thematic/Publishing Logic and its libraries will work simultaneously with the Digital Content logic databases to call on the appropriate information or data.

While this is occurring, an additional process is being managed, by sending the data to the business intelligence service engine that is servicing and monitoring the QIE for constant updates of information for storage, retrieval, report generation, etc. These operations occur in every thematic application, not just the holographic thematic applications. The data collected, which is useful for the sponsor of any part of the thematic application, will be sent via standard APIs to an intranet site and stored. This data is accessible only if the sponsor has the appropriate login and password to retrieve the information.

In the example of the warehouse holographic environment, the user/avatar may address a NPC in the thematic environment. The NPC could be a hologram generated by the footsteps, voice or position of the avatar in the thematic environment. In the background, music particular to the environment (i.e., location, city, country etc.) may be playing. The music is activated based on the thematic application storyline that is tied to specific display content or activated by the avatar/user. The music is obtained by a request made by the GUI for information/data from the QIE to locate a music piece that either has been stored in the Digital Content database or can be accessed via the satellite service system.

The voice is generated by the GUI which requests the appropriate information via an API to the AI library and to the voice libraries for both movement, high level action, and the processing of the voice data. The voice library will then transmit this information in some type of recognized data form back through a standard communication device and output to the speakers or other device and the movement will be displayed on the screen via the GUI.

As the avatar is moving around the streets and stores in the holographic environment, an information request is made by the sensor controllers connected via cable or standard communication devices/application to the main computer system, to the GUI, which transmits the data to the Business logic via the WWW. The data/information is sent back to the client system through the API, to the Business Intelligence tracking service, which tracks the information in a database in the Business Intelligence layer.

If the user/avatar touches a bag of coffee beans, it will take the user to the sponsor website. This information is transmitted through the communication channel and connects to an API that activates the sponsor library located in the Thematic/Publishing logic. The information is processed and passed back by the program through the QIE for processing or re-rasterization depending upon the device.

To further the example, the user/avatar may view a display screen within the thematic environment that shows a game in progress, for example, being televised from a foreign country. The program will show captions on the screen that translate the broadcast language from one language to another. Again, the movement of the avatar is generated by the GUI transmitting data through a standard communications pipe to the server. The data is transmitted to the QIE, which processes the information and sends the information to the appropriate library for processing. In this case it is the Thematic Application layer and within this layer the Graphics application library connected to the QIE via APIs. The information on the screen is transmitted via the WWW through a communication portal that sends the information directly to the Satellite service component that services the Digital content library. To further the example with respect to the translation mechanism, the information is transmitted via the WWW and routes to the Translation service component that services both the Digital content library and the Business Logic.

In another embodiment of the holographic system consistent with the present invention, the system may use holographic technology in a "globe" type of screen or terminal. A user would be able to alter or manipulate the holograms by touching the globe, and thereby change the holograms, despite where the globe is touched.

For example, the user may select an option in the globe to display a certain DNA sampling. The user may touch the globe to pull out a level of the DNA—therefore, the sampling will automatically change. The globe may also be designed for 3D simulation and may be used to move objects, to display and manipulate the objects within the globe as a terminal.

In another example of the holographic environment, one application is playing chess with holographically projected chess pieces in the digital warehouse. The user could move the chess pieces/players and compete against another person in the digital warehouse. In order for this to occur, there would be a board or large ½ inch type of flooring that is raised above the floor. To activate the full sized chess match, the user would select the chess game as they are walking by that area either through a voice command, selection of a menu item, or by stepping on the board and activating the sensor in the controller to allow for holographic chess players to appear. The user may then use voice activation to move his/her objects. The chess game would appear using holographic technology. If the chess game is in an enclosed "globe" like a PC, the holograms would be manipulated by the touching of the screen and the objects.

In all the above types of applications, a sponsor can place his product within the thematic application for advertisement and access by a user of the thematic application. Specifically, the sponsor is provided with a login and password by the licensor of the thematic application, and the licensor can manage the processes, generate logins and passwords, manage the security of the system, update the system, and manage the overall maintenance. These operations are all performed by the licensor through a menu generated by the program on the screen or display via the GUI. The GUI then transmits the information to the appropriate operating system, software, and hardware environments. This data is stored in the Business Intelligence component of the QIE in the sponsors' library. The information is ready to be accessed either in a screen display format or in a report form.

Once the sponsor logs into the thematic application system, the sponsor can decide if they wish to receive a printed report or a report that is displayed on the screen. Depending upon what the sponsor selects, the information will be send through standard internet connections to the QIE and to the Business Logic and then to the Business Intelligence service for processing.

If the program is instructed to display to the screen, the information will be passed through the QIE for processing to that particular display screen and sent to the GUI for actual display.

If the information is to be printed, the information will be processed from the Business Logic connecting to the Business Intelligence service, and a printed report is requested by the program. The Business Intelligence service may send the information directly to the GUI and the drivers for a particular device that will be displayed on the screen for printing. The user now has the option of selecting the appropriate print engine and may print to that device. The information displayed or printed is constantly being updated in "real time".

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. One or more non-transitory computer readable medium storing an interactive software application platform comprising:
    at least one thematic/publishing logic module containing virtual thematic environment rules to coordinate actions to be taken to constitute and provide a virtual thematic environment on a visual component, the virtual thematic environment being a theme-based virtual world environment;
    a primary application providing the virtual thematic environment; and a secondary application within the primary application, the secondary application being different from the primary application, the secondary application being launched from the primary application, and having first content utilized within a same application environment as second content provided by the primary application;
    a graphics user interface (GUI) module including software that renders graphical display elements onto the visual component and permits a user to interact with a graphical display element within the virtual thematic environment, the GUI module providing a first user interface that is associated with the primary application and enabling the user to access the primary application through the first user interface, and a second user interface associated with the secondary application and enabling the user to access the secondary application through the second user interface;
    a quantum imaging environment (QIE) module, the QIE module being a software layer that receives, interprets, and manipulates the second content so as to be accessible on different types of devices for use within the virtual thematic environment, the QIE module obtaining first real-time information and second real-time information, the QIE module supplying the first real-time information into the primary application, and supplying the second real-time information into the secondary application, the primary application configured to provide access to the first real-time information to the user within the virtual thematic environment via the first user interface, the secondary application configured to provide the second real-time information to the user within the virtual thematic environment via the second user interface; and
    at least one digital content library module storing information, the information containing 2 dimensional and 3 dimensional content, and providing content management of information within the virtual thematic environment coordinated by the thematic/publishing logic module, the digital content library module being a content management application.

2. The one or more non-transitory computer readable medium according to claim 1, wherein said first real-time information includes GPS information.

3. The one or more non-transitory computer readable medium according to claim 1, wherein said first real-time information and said second real-time information are accessed by a user selection mechanism.

4. The one or more non-transitory computer readable medium according to claim 3, wherein said selection mechanism is a voice recognition system.

5. The one or more non-transitory computer readable medium according to claim 3, wherein said selection mechanism is a hot click button.

6. The one or more non-transitory computer readable medium according to claim 1, wherein said first real-time information is information associated with a real-world geographic location of a user, and wherein the primary application uses the information to show the real-world location of the user within the virtual thematic environment.

7. The one or more non-transitory computer readable medium according to claim 1, wherein said first real-time information and said second real-time information are provided to the user via a mobile device.

8. The one or more non-transitory computer readable medium according to claim 1, wherein at least one of the first real-time information and the second real-time information are downloaded from a source external to the virtual thematic environment.

9. The one or more non-transitory computer readable medium according to claim 8, wherein said first real-time information and said second real-time information are downloaded from the Internet.

10. The one or more non-transitory computer readable medium according to claim 1, wherein at least one of said first real-time information and said second real-time information are automatically downloaded based on actions of the user within the virtual thematic environment.

11. The one or more non-transitory computer readable medium according to claim 1, wherein the user is provided with objects within the virtual thematic environment which operate in real-time with real-time information.

12. The one or more non-transitory computer readable medium according to claim 1, wherein the at least one secondary application includes at least one of an entertainment application, a business application, a publishing application, a game application, a financial application, a music application, a graphic application, an education application, a medical application, a word processing application, an electronic mail application, a spreadsheet application, a static purchasing application, an instant messaging application, and a video messaging application.

13. The one or more non-transitory computer readable medium according to claim 6, further comprising providing real time language translation of said first real-time information and said second real-time information.

14. The one or more non-transitory computer readable medium according to claim 6, wherein said virtual thematic environment is holographically projected.

15. One or more non-transitory computer readable medium comprising:
at least one thematic/publishing logic module containing virtual thematic environment rules to coordinate actions to be taken to constitute a virtual thematic environment, the virtual thematic environment being a theme-based virtual world environment;
a primary application configured to provide the virtual thematic environment;
a secondary application within the primary application, the secondary application being different from the primary application, the secondary application being launched from the primary application, and having first content utilized within a same application environment of the virtual thematic environment as second content provided by the primary application, the primary application receiving and using first real-time information to provide the second content, wherein said first real-time information is information associated with a real-world location of a user, and wherein the primary application uses the information to show the real-world location of the user within the virtual thematic environment, the secondary application receiving and using second real-time information to provide the first content, the first real-time information being different from the second real-time information,
a graphics user interface (GUI) module including software rendering graphical display elements onto a visual component, the GUI module including software that renders graphical display elements onto the visual component and permits the user to interact with the graphical display elements within the virtual thematic environment, the GUI module providing a first user interface that is associated with the primary application and enabling the user to access the primary application through the first user interface, and a second user interface associated with the secondary application and enabling the user to access the secondary application through the second user interface;
a quantum imaging environment (QIE) module, the QIE module being a software layer that receives, interprets, and manipulates the first content and the second content so as to be accessible on different types of devices for use within the virtual thematic environment; and
at least one digital content library module storing information and providing content management of information within the virtual thematic environment, the digital content library module being a content management application.

16. The one or more non-transitory computer readable medium according to claim 15, wherein the virtual thematic environment is a game environment.

17. The one or more non-transitory computer readable medium according to claim 15, wherein the first real-time information and the second real-time information include audio, video, text, or any combination thereof.

18. The one or more non-transitory computer readable medium according to claim 15, wherein the first real-time information and the second real-time information is new or updated information.

19. The one or more non-transitory computer readable medium, according to claim 18, wherein at least one of the first real-time information and the second real-time information is live data.

20. The one or more non-transitory computer readable medium according to claim 15, wherein a first device of the devices includes a client system, and wherein the first real-time information is location data identifying a location of the client system.

21. The one or more non-transitory computer readable medium according to claim 20, wherein the client system includes a GPS system, and wherein the location data is generated by the GPS system of the client system.

22. One or more non-transitory computer readable medium comprising:
at least one thematic/publishing logic module containing virtual thematic environment rules to coordinate actions to be taken to constitute a virtual thematic environment, the virtual thematic environment being a theme-based virtual world environment;
a primary application providing the virtual thematic environment;
a secondary application within the primary application, the secondary application being different from the primary application, the secondary application being launched from the primary application, the secondary application being an electronic messaging component utilized within a same application environment as content provided by the primary application, the primary application receiving and using location information to provide the content based upon a real-world location of a user, and wherein the primary application uses the location information to show the real-world location of the user within the virtual thematic environment;
a graphics user interface (GUI) module, the GUI module including software that renders graphical display elements onto a visual component and permits the user to interact with the graphical display elements within the virtual thematic environment, the GUI module providing a first user interface that is associated with the primary application and enabling the user to access the primary application through the first user interface, and a second user interface associated with the secondary application and enabling the user to access the secondary application through the second user interface;
a quantum imaging environment (QIE) module, the QIE module being a software layer configured to receive and interpret content such that the content is manipulated so as to be accessible on different types of devices for use within the virtual thematic environment; and
at least one digital content library module storing information and providing content management of information within the virtual thematic environment, the digital content library module being a content management application.

23. A computer system, comprising:
a client system and a server system communicating to provide an interactive software application platform, the interactive software application platform comprising:
at least one thematic/publishing logic module containing virtual thematic environment rules to coordinate actions to be taken to constitute a virtual thematic environment, the virtual thematic environment being a theme-based virtual world environment;

a graphics user interface (GUI) module, the GUI module including software that renders graphical display elements onto a visual component and permits the user to interact with the graphical display elements within a virtual thematic environment;

a primary application providing the virtual thematic environment;

a secondary application within the primary application, the secondary application being different from the primary application, the secondary application being launched from the primary application, and having first content utilized within a same application environment of the virtual thematic environment as second content provided by the primary application, the primary application receiving and using first real-time information to provide the second content, the secondary application receiving and using second real-time information to provide the first content, the first real-time information being different from the second real-time information;

a quantum imaging environment (QIE) module, the QIE module being a software layer configured to receive and interpret the first content and the second content such that the first content and the second content is manipulated so as to be accessible on different types of devices for use within the virtual thematic environment;

at least one digital content library module storing information and providing content management of information within the virtual thematic environment, the digital content library module being a content management application; and wherein the GUI module includes software that renders graphical display elements onto the visual component and permits the user to interact with the graphical display elements within the virtual thematic environment, the GUI module providing a first user interface that is associated with the primary application and enabling the user to access the primary application through the first user interface, and a second user interface associated with the secondary application and enabling the user to access the secondary application through the second user interface.

24. The computer system according to claim 23, wherein the virtual thematic environment is a game environment.

25. The computer system according to claim 23, wherein the first real-time information and the second real-time information include audio, video, text, or any combination thereof.

26. The computer system according to claim 23, wherein the first real-time information and the second real-time information is new or updated information.

27. The computer system according to claim 23, wherein at least one of the first real-time information and the second real-time information is live data.

28. The computer system according to claim 23, wherein the first real-time information is location data identifying a location of the client system.

29. The computer system according to claim 28, wherein the second real-time information includes live video.

30. The computer system according to claim 28, wherein the secondary application includes an electronic messaging component.

* * * * *